United States Patent
Meng et al.

(10) Patent No.: US 11,616,586 B2
(45) Date of Patent: Mar. 28, 2023

(54) PERIOD MAPPING METHOD AND NETWORK DEVICE

(71) Applicant: Huawei Technologies Co., Ltd., Shenzhen (CN)

(72) Inventors: Rui Meng, Beijing (CN); Li Qiang, Beijing (CN); Chuang Wang, Beijing (CN)

(73) Assignee: Huawei Technologies Co., Ltd., Shezhen (CN)

( * ) Notice: Subject to any disclaimer, the term of this patent is extended or adjusted under 35 U.S.C. 154(b) by 84 days.

(21) Appl. No.: 17/185,679

(22) Filed: Feb. 25, 2021

(65) Prior Publication Data

US 2021/0184781 A1 Jun. 17, 2021

Related U.S. Application Data

(63) Continuation of application No. PCT/CN2019/099296, filed on Aug. 5, 2019.

(30) Foreign Application Priority Data

Aug. 27, 2018 (CN) .......................... 201810983768.3

(51) Int. Cl.
*H04J 3/06* (2006.01)
*H04L 7/00* (2006.01)

(52) U.S. Cl.
CPC .......... *H04J 3/0638* (2013.01); *H04L 7/0016* (2013.01)

(58) Field of Classification Search
CPC .. H04J 3/0638; H04L 7/0016; H04L 61/5014; H04L 67/04
See application file for complete search history.

(56) References Cited

U.S. PATENT DOCUMENTS 7,173,918 B2 * 2/2007 Awater ................. H04W 36/22
370/332
9,319,332 B2 4/2016 Thubert et al.
(Continued)

FOREIGN PATENT DOCUMENTS

| CN | 101521586 A | 9/2009 |
| CN | 101534222 A | 9/2009 |

(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.0.0, total 181 pages, 3rd Generation Partnership Project, Valbonne, France (Dec. 2017).

*Primary Examiner* — Chandrahas B Patel

(57) ABSTRACT

Embodiments of this application provide a period mapping method and a network device. The method includes: receiving, by a downstream first network device, first information sent by an upstream second network device, where the first information carries a number of the $1^{st}$ period of the second network device, the number is referred to as a first number, and the first number includes a first label number and a first group number; and establishing, by the first network device, mapping relationships between numbers of a plurality of periods of the first network device and numbers of a plurality of periods of the second network device based on a mapping relationship between a second label number and a second group number that are included in a number of a first period that can be used to send the first information and a first label number and a first group number.

17 Claims, 11 Drawing Sheets

(56) References Cited

U.S. PATENT DOCUMENTS

| 9,825,839 B2 * | 11/2017 | Metts ................ H04L 43/0847 |
| 2007/0110059 A1 | 5/2007 | Spires et al. |
| 2016/0182215 A1 | 6/2016 | Valenza et al. |

FOREIGN PATENT DOCUMENTS

| CN | 101577957 A | 11/2009 |
| CN | 102014431 A | 4/2011 |
| CN | 105393617 A | 3/2016 |
| EP | 3174342 A1 | 5/2017 |

* cited by examiner

PERIOD MAPPING METHOD AND NETWORK DEVICE

CROSS-REFERENCE TO RELATED APPLICATIONS

This application is a continuation of International Application No. PCT/CN2019/099296, filed on Aug. 5, 2019, which claims priority to Chinese Patent Application No. 201810983768.3, filed on Aug. 27, 2018. The disclosures of the aforementioned applications are hereby incorporated by reference in their entireties.

TECHNICAL FIELD

This application relates to the communications field, and more specifically, to a period mapping method and a network device.

BACKGROUND

Deterministic networking is a hotspot currently discussed in the industry, and a core of the deterministic networking is to ensure an end-to-end bandwidth, delay, and jitter of a service flow. Scale-extensible data-plane deterministic packet scheduling needs to be implemented to meet an end-to-end deterministic jitter of a packet.

In a packet scheduling method provided in the prior art, a uniform jitter is set for an entire network. However, if a uniform jitter is still set for the entire network when architectures of packet scheduling between all network devices in the entire network are inconsistent, packet scheduling timeliness is affected. Therefore, when architectures of packet scheduling between all network devices in an entire network are inconsistent, how to establish mapping relationships between periods of different network devices in the network to improve packet scheduling timeliness is a problem urgently needing to be resolved.

SUMMARY

This application provides a period mapping method and a network device, to establish a mapping relationship between periods of different network devices, to improve packet scheduling timeliness.

According to a first aspect, a period mapping method is provided, and includes: receiving, by a first network device, first information sent by a second network device, where the first information carries a first number, the first number is a number of the $1^{st}$ period of the second network device, and the first number includes a first label number and a first group number; determining, by the first network device, a first period that can be used to send the first information, where a second number of the first period includes a second label number and a second group number, and the first label number and the first group number meet a mapping relationship with the second label number and the second group number; and establishing, by the first network device, mapping relationships between numbers of a plurality of periods of the first network device and numbers of a plurality of periods of the second network device based on the mapping relationship.

Optionally, the first network device and the second network device belong to different forwarding architectures, and the forwarding architectures correspond to different jitters; or the first network device and the second network device belong to a same forwarding architecture, but a jitter of the first network device is inconsistent with a jitter of the second network device due to another reason.

The first network device is a downstream device of the second network device in a network.

According to the period mapping method in this embodiment of this application, the first information carries the first number of the $1^{st}$ period of the second network device, so that the first network device establishes the mapping relationships between the numbers of the plurality of periods of the first network device and the numbers of the plurality of periods of the second network device based on the mapping relationship between the first number of the $1^{st}$ period and the second number of the first period that can be used to send the first information.

Specifically, because the jitter of the first network device is inconsistent with the jitter of the second network device, the number of the $1^{st}$ period includes the first label number and the first group number, and the second number includes the second label number and the second group number, so that the mapping relationships are successfully established.

With reference to the first aspect, in some implementations of the first aspect, the determining, by the first network device, a first period that can be used to send the first information includes: determining, by the first network device based on a first moment and a first jitter jitter, the first period that can be used to send the first information, where the first moment is a moment at which the first network device receives the first information, and the first jitter is a jitter of the first network device.

According to the period mapping method in this embodiment of this application, the first network device can determine, based on the received first information and the jitter of the first network device, the first period that can be used to send the first information.

With reference to the first aspect, in some implementations of the first aspect, before the receiving, by a first network device, first information sent by a second network device, the method further includes: determining, by the first network device, m based on the first jitter jitter, where m is a quantity of label numbers used to identify the periods of the first network device, and the first jitter is the jitter of the first network device; receiving, by the first network device, second information sent by the second network device, where the second information indicates n, n is a quantity of label numbers used to identify the periods of the second network device, and m and n are positive integers; and numbering, by the first network device, each period of the first network device based on m and n.

According to the period mapping method in this embodiment of this application, the first network device can determine, based on the jitter of the first network device, the quantity m of the label numbers used to identify the periods of the first network device, and number each period of the first network device based on m and the quantity n of the label numbers used to identify the periods of the second network device, to provide a new numbering manner when the jitter of the first network device is inconsistent with the jitter of the second network device.

With reference to the first aspect, in some implementations of the first aspect, the numbering, by the first network device, each period of the first network device based on m and n includes: calculating, by the first network device, a least common multiple L of m and n; determining, by the first network device based on L and m, a quantity x of groups into which the periods of the first network device can be divided; and numbering, by the first network device, each period of the first network device based on m and x, where the number of each period of the first network device includes a label number and a group number.

According to the period mapping method in this embodiment of this application, the first network device can determine, based on m and the least common multiple L of m and n, a quantity of groups into which all periods in one super frame of the first network device can be divided, where one super frame includes L periods in total, so that the quantity of periods in one super frame of the first network device is the same as a quantity of periods in one super frame of the second network device, facilitating establishment of the mapping relationships between the periods.

It should be understood that in this application, the least common multiple L of m and n is selected as the quantity of periods in one super frame, to improve period mapping performance. Actually, the quantity of periods included in the super frame only needs to be a common multiple of m and n.

With reference to the first aspect, in some implementations of the first aspect, the quantity of groups is x=L/m, and each group in the x groups of periods includes m periods.

According to the period mapping method in this embodiment of this application, L periods of the first network device are divided into x groups, and each group includes m periods, so that the periods of the first network device are in one-to-one correspondence to the periods of the second network device.

With reference to the first aspect, in some implementations of the first aspect, the method further includes: sending, by the first network device, third information to the second network device, where the third information indicates m, and m is used to support the second network device in numbering each period of the second network device.

According to the period mapping method in this embodiment of this application, the first network device sends the third information to the second network device, to indicate m, so that the second network device can number each period of the second network device.

With reference to the first aspect, in some implementations of the first aspect, that the first information carries the first number includes: p bits of the first information are used to indicate a value of the first label number; and q bits of the first information are used to indicate a value of the first group number, where p and q are positive integers.

According to the period mapping method in this embodiment of this application, bit values of the first information are used to indicate the value of the first label number and the value of the first group number, so that the value of the first label number and the value of the first group number can be indicated explicitly.

According to a second aspect, a period mapping method is provided, and includes: determining, by a second network device, a first number, where the first number is a number of the $1^{st}$ period of the second network device, and the first number includes a first label number and a first group number; and sending, by the second network device, first information to a first network device, where the first information carries the first number, and the first information is used to support the first network device in establishing mapping relationships between numbers of a plurality of periods of the first network device and numbers of a plurality of periods of the second network device.

According to the period mapping method in this embodiment of this application, in order that a downstream device can establish mapping relationships between periods of an upstream device and periods of a downstream device, when a jitter of the first network device is inconsistent with a jitter of the second network device, the second network device sends the first information to the first network device, and adds the first number of the $1^{st}$ period of the second network device to the first information, so that the first network device establishes the mapping relationships between the numbers of the plurality of periods of the first network device and the numbers of the plurality of periods of the second network device based on the first number of the $1^{st}$ period and a second number of a first period that can be used to send the first information.

Specifically, the number of the $1^{st}$ period includes the first label number and the first group number, and the second number includes a second label number and a second group number, so that the mapping relationships are successfully established.

With reference to the second aspect, in some implementations of the second aspect, the determining, by a second network device, a first number includes: determining, by the second network device, n based on a second jitter jitter, where n is a quantity of label numbers used to identify the periods of the second network device, and the second jitter is a jitter of the second network device; receiving, by the second network device, third information sent by the first network device, where the third information indicates m, m is a quantity of label numbers used to identify the periods of the first network device, and m and n are positive integers; and numbering, by the second network device, each period of the second network device based on m and n, and determining the first number.

According to the period mapping method in this embodiment of this application, the second network device can determine, based on the jitter of the second network device, the quantity n of the label numbers used to identify the periods of the second network device, and number each period of the second network device based on n and the quantity m of the label numbers used to identify the periods of the first network device, to provide a new numbering manner when the jitter of the first network device is inconsistent with the jitter of the second network device.

With reference to the second aspect, in some implementations of the second aspect, the numbering, by the second network device, each period of the second network device based on m and n includes: calculating, by the second network device, a least common multiple L of m and n; determining, by the second network device based on L and n, a quantity y of groups into which the periods of the second network device can be divided; and numbering, by the second network device, each period of the second network device based on n and y, where the number of each period of the second network device includes a label number and a group number.

According to the period mapping method in this embodiment of this application, the second network device can determine, based on n and the least common multiple L of m and n, a quantity of groups into which all periods in one super frame of the second network device can be divided, where one super frame includes L periods in total, so that a quantity of periods in one super frame of the first network device is the same as the quantity of periods in one super frame of the second network device, facilitating establishment of the mapping relationships between the periods.

It should be understood that in this application, the least common multiple L of m and n is selected as the quantity of periods in one super frame, to improve period mapping performance. Actually, the quantity of periods included in the super frame only needs to be a common multiple of m and n.

With reference to the second aspect, in some implementations of the second aspect, the quantity of groups is y=L/n, and each group in the y groups of periods includes n periods.

According to the period mapping method in this embodiment of this application, L periods of the second network device are divided into y groups, and each group includes n periods, so that the periods in one super frame of the first network device are in one-to-one correspondence to the periods in one super frame of the second network device.

With reference to the second aspect, in some implementations of the second aspect, the method further includes: sending, by the second network device, second information to the first network device, where the second information indicates n, and n is used to support the first network device in numbering each period of the first network device.

According to the period mapping method in this embodiment of this application, the second network device sends the second information to the first network device, to indicate n, so that the first network device can number each period of the first network device.

With reference to the second aspect, in some implementations of the second aspect, that the first information carries the first number includes: p bits of the first information are used to indicate a value of the first label number; and q bits of the first information are used to indicate a value of the first group number, where p and q are positive integers.

According to the period mapping method in this embodiment of this application, bit values of the first information are used to indicate the value of the first label number and the value of the first group number, so that the value of the first label number and the value of the first group number can be indicated explicitly.

According to a third aspect, a first network device is provided. The first network device is configured to perform the period mapping method in the first aspect or any possible implementation of the first aspect.

Specifically, the first network device may include units configured to perform the period mapping method in the first aspect or any possible implementation of the first aspect.

According to a fourth aspect, a first network device is provided. The first network device includes a processor and a transceiver. The processor communicates with the transceiver by using an internal connection path.

Optionally, the first network device further includes a memory. The memory is configured to store an instruction, and the processor is configured to execute the instruction stored in the memory.

In an optional implementation, the processor performs the method in the first aspect or any possible implementation of the first aspect.

According to a fifth aspect, a computer readable storage medium is provided, and stores a computer program, where when the program is executed by a processor, the method in the first aspect or any possible implementation of the first aspect is implemented.

According to a sixth aspect, a computer program product is provided. The computer program product includes computer program code, and when the computer program code is run by a communications unit and a processing unit, or a transceiver and a processor of the first network device, the first network device is enabled to perform the method in the first aspect.

According to a seventh aspect, a chip system is provided, and includes a processor, configured to support a first network device in implementing the method in the first aspect. In an optional implementation, the processor in the chip system is configured to support the first network device in implementing the method in the fourth aspect.

According to an eighth aspect, a second network device is provided. The second network device is configured to perform the period mapping method in the second aspect or any possible implementation of the second aspect.

Specifically, the second network device may include units configured to perform the period mapping method in the second aspect or any possible implementation of the second aspect.

According to a ninth aspect, a second network device is provided. The second network device includes a processor and a transceiver. The processor communicates with the transceiver by using an internal connection path.

Optionally, the second network device further includes a memory. The memory is configured to store an instruction, and the processor is configured to execute the instruction stored in the memory.

In an optional implementation, the processor performs the method in the second aspect or any possible implementation of the second aspect.

According to a tenth aspect, a computer readable storage medium is provided, and stores a computer program, where when the program is executed by a processor, the method in the second aspect or any possible implementation of the second aspect is implemented.

According to an eleventh aspect, a computer program product is provided. The computer program product includes computer program code, and when the computer program is run by a communications unit and a processing unit, or a transceiver and a processor of the second network device, the second network device is enabled to perform the method in the second aspect.

According to a twelfth aspect, a chip system is provided, and includes a processor, configured to support a second network device in implementing the method in the second aspect.

According to a thirteenth aspect, a period mapping system is provided, including one or more of the first network device and the second network device described above.

In a possible design, the period mapping system may further include another device that interacts with the first network device and the second network device in the solution provided in this embodiment of this application, and the like.

According to the period mapping method and the network device that are provided in the embodiments of this application, the first number of the $1^{st}$ period of the second network device is added to the first information sent by the second network device to the first network device, and when the jitter of the first network device is inconsistent with the jitter of the second network device, the first number includes the first label number and the first group number, so that the first network device can establish mapping relationships between periods of different network devices, to improve packet scheduling timeliness.

DESCRIPTION OF EMBODIMENTS

The following describes technical solutions of this application with reference to accompanying drawings.

Figure 1:
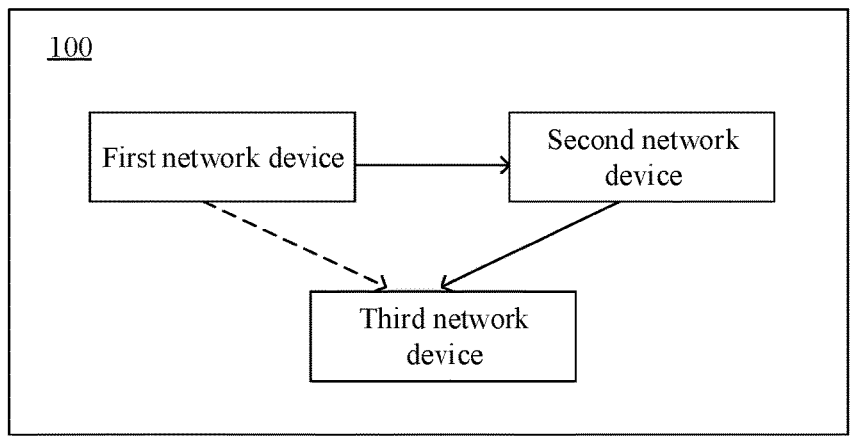
FIG. 1 is a schematic diagram of a network 100 to which embodiments of this application are applicable.

FIG. 1 is a schematic diagram of a network 100 to which embodiments of this application are applicable. The network 100 includes a first network device, a second network device, and a third network device.

Specifically, the first network device, the second network device, and the third network device are any three network devices in the network 100. Packet forwarding can be performed between the three network devices.

Specifically, the three network devices include a downstream network device and an upstream network device. In other words, a packet of the upstream network device can be forwarded to the downstream network device, and is forwarded by the downstream network device.

For example, the first network device is an upstream network device, and the second network device is a downstream network device of the first network device. Then, the first network device may send, to the second network device, a packet needing to be sent, and the second network device forwards the packet.

For example, the third network device is a downstream network device of the second network device. The second network device forwards the packet to the third network device, and the third network device forwards the packet.

Alternatively, both the first network device and the second network device are upstream network devices of the third network device. Then, the first network device and the second network device may send, to the third network device, packets needing to be sent, and the third network device forwards the packets.

For example, the first network device, the second network device, and third network device may be routers or other network devices that can forward packets.

It should be understood that this embodiment of this application does not limit a quantity of network devices specifically included in the network 100 and an upstream and downstream relationship between network devices. FIG. 1 is merely an example, and cannot constitute any limitation to the protection scope of this application.

It should be further understood that the network 100 in FIG. 1 may further include another network device, or another terminal device communicating with the network devices, and this is not limited in this application.

Further, the network 100 may be deterministic networking. The deterministic networking is a hotspot currently discussed in the industry, and the following briefly describes the deterministic networking.

Network models constructed by using a complex system mainly include two network models. One is a network generated in a random manner, and the other is a network constructed in a deterministic manner.

The random network is not applicable to a communication network including fixed node connectivity, and the deterministic networking is a network that is constructed in the deterministic manner and that reflects a real system characteristic.

Specifically, the deterministic networking is required by an industrial internet, an intelligent plant, a programmable logic controller (programmable logic controller, PLC) remote, cloudification, and the like, and the deterministic networking is also required by a remote real-time service such as augmented reality (augmented reality, AR)/virtual reality (virtual reality, VR) real-time interaction, a remote surgery, or tactile internet.

To better understand the technical solutions recorded in the embodiments of this application, the following first briefly describes several basic concepts used in this application.

1. Periodic Shaping.

Each flow (flow) entering a network device needs to meet or to form, through shaping, the following mode:

A total quantity of bytes of the flow in each period (T) should not exceed a product of a bandwidth and the period. It is assumed that an $i^{th}$ flow entering the network device is referred to as flow_i, and an average bandwidth in a service level agreement (service level agreement, SLA) of the flow_i is bandwidth_i. Then, a total quantity of bytes of the flow_i in each T should not exceed bandwidth_i*T.

It should be understood that the period (T) is a uniform period value in the network, and a value of each period of each network device in the network is T.

For example, the period is T=10 µs, and the bandwidth is 1000 Mbps. Then, a total quantity of bytes that are of any flow and that are allowed to be sent in each period is 1000 Mbps*10 µs=125*10^6 B/s*10^-5 s=1250 B.

2. Periodic Forwarding

A packet sent through an outbound interface of a network device in one period is a sum of packets that are of all traffic carried on the outbound interface and that are sent in one period.

In other words, the following case does not exist: Traffic of a flow in one period is forwarded by a network device in a plurality of periods, or traffic of a flow in a plurality of periods is forwarded by one network device in one period.

For example, a total quantity of packets sent through an outbound interface 1 of a network device in a period A is 12500 B, and a flow carried on the outbound interface 1 includes flow_i (i=1, 2, 3, . . . , m).

Then, a sum of traffic that is of all flows carried on the outbound interface 1 and that is in the period A is 12500 B, and may be represented as:

$$\sum_{1}^{m}(\text{date\_flow\_i}),$$

where date_flow_i indicates traffic of each flow in the period A.

Specifically, periodic forwarding is ensured through period exchange.

3. Period Exchange.

An inbound interface of a network device receives a packet that is in a period of an upstream network device, and the packet carries a label of the period. The network device searches for an arrival outbound interface through routing, and maps the packet to one period of the corresponding outbound interface by using a fixed mapping relationship between a period of the inbound interface and a period of the outbound interface, to ensure that packets sent through the outbound interface in one period are a sum of packets that are of all traffic carried on the outbound interface and that are sent in one period.

A period label is identification information that can identify the period. The fixed mapping relationship between the period of the inbound interface and the period of the outbound interface is preset.

For example, the fixed mapping relationship between the period of the inbound interface and the period of the outbound interface is as follows: A packet that is received through an inbound interface 1 of a network device and that carries a period label being a period A is sent in a period B of an outbound interface 1 of the network device.

For example, a sum of packets that are received through the inbound interface 1 of the network device and that carry period labels being the period A is 12500 B.

It should be understood that the received packet carries a label of the period A. For example, the label of the period A may be A, and can be used to determine the period A, or a label of the period A may be other identification information that can be used to determine the period A.

Further, the network device searches for an outbound interface through routing, and determines that an outbound that meets a routing relationship with the inbound interface 1 is the outbound interface 1. The network device then maps, based on a fixed mapping relationship between the period A and the period B, the received 12500 B packets to the period B of the outbound interface 1.

Therefore, all the received 12500 B packets are sent in the period B of the outbound interface 1.

The foregoing describes a scenario to which this application can be applied and basic concepts used in the embodiments of this application, and the following briefly describes a basic condition that packet forwarding needs to meet in the application scenario shown in FIG. 1.

Specifically, a core of deterministic networking is to ensure an end-to-end bandwidth, delay, and jitter of a service flow. A delay in the deterministic networking may be referred to as a "deterministic latency".

The "deterministic latency" means that when a packet meets an unexpected requirement, a delay (delay) and a jitter (jitter) of packet transmission meet an upper limit defined in the network. A varying delay is referred to as a jitter, and the jitter is briefly referred to as a jitter below.

Scale-extensible data-plane deterministic packet scheduling needs to be implemented to meet an end-to-end deterministic jitter of a packet.

Specifically, deterministic packet scheduling involves a label number of a period of a network device.

The following describes in detail deterministic packet scheduling that is based on a label number of a period of a network device.

First, a packet is scheduled in a corresponding period based on a label number that is of the period of the network device and that is carried in the packet. A quantity of bytes that are of a packet and that are allowed to be sent in one period is $$\sum_{1}^{m}(\text{date\_flow\_i}).$$

Second, a period number is obtained through cyclic numbering based on a quantity of label numbers of a plurality of periods.

For example, there are three label numbers of periods. Period numbers may be 0, 1, 2, 0, 1, 2, . . . ; or may be 1, 2, 3, 1, 2, 3, . . . .

It should be noted that:

1. A quantity of label numbers of periods is very dependent on a hop-by-hop jitter. The quantity of the label numbers of the periods is N=2+(jitter/T).

Specifically, hop by hop is a gating module spacing between an upstream network device and a downstream network device in the network.

2. An expected end-to-end delay (excluding a line delay) is h*(jitter+1.5T), and h is a quantity of hops (hop) between ends.

End to end means that a packet sent by a network device in the network arrives at a network device that forwards the packet in the network. A longest delay of each hop is jitter+2T, and a shortest delay is jitter+T.

For example, a packet sent by the first network device in the network is sent by the third network device in the network. First, the first network device sends the packet to the second network device, and then the second network device sends the packet to the third network device.

Then, h=2, and the expected end-to-end delay is 2*(jitter+1.5T).

Packet scheduling performed based on a label number of a period of a network device involves a quantity of label numbers of periods. The following briefly describes the quantity of the label numbers of the periods with reference to FIG. 2 to FIG. 4.

Figure 2:
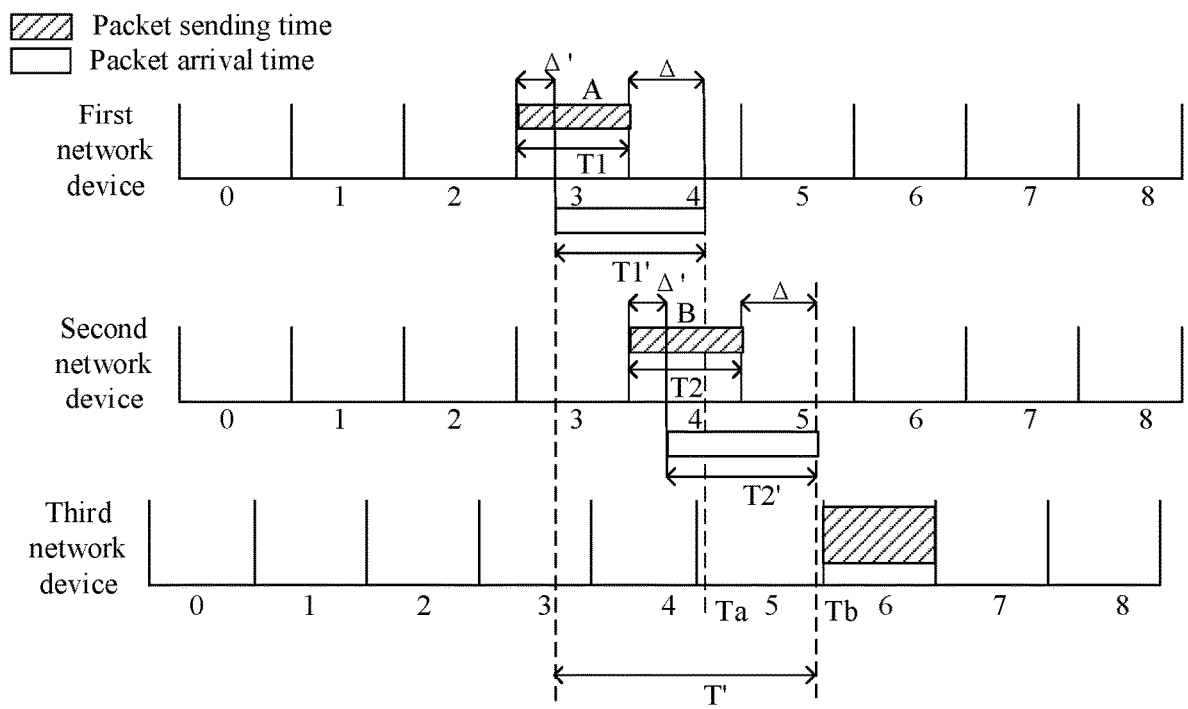
FIG. 2 is a schematic diagram of packet forwarding according to an embodiment of this application.

FIG. 2 is a schematic diagram of packet forwarding according to an embodiment of this application. The schematic diagram includes a first network device, a second network device, and a third network device.

For example, both of two upstream network devices (the first network device and the second network device in FIG. 2) send packets to one downstream network device (the third network device in FIG. 2), and a process is as follows:

First, it should be understood that there is a delay when a packet is transmitted between two neighboring network devices, and a range of the delay is referred to a jitter.

For example, as shown in FIG. 2, there is a delay when the first network device sends a packet A to the third network device, where Δ' is a shortest delay of sending, by the first network device, a packet to the third network device, and A is a longest delay of sending, by the first network device, a packet to the third network device. Then, a jitter is Δ−Δ'.

For another example, as shown in FIG. 2, there is a delay when the second network device sends a packet B to the third network device, where Δ' is a shortest delay of sending, by the second network device, a packet to the third network device, and Δ is a longest delay of sending, by the second network device, a packet to the third network device. Then, a jitter is Δ−Δ'.

The jitter existing when the first network device sends the packet to the third network device is the same as the jitter existing when the second network device sends the packet to the third network device, and it may be understood that a uniform jitter is set for the entire network.

It should be further understood that a packet sending network device constantly sends, in a time range, packets to a packet receiving network device.

For example, as shown in FIG. 2, the first network device sends the packet A to the third network device, and a sending time range of the packet A is as follows: A rectangle filled with slashes in FIG. 2 represents a sending time range (T1) of a packet in one period of the first network device.

It should be understood that the packet A is merely a representation of a packet sent by the first network device to the third network device, and this application does not limit a constitution of the packet A. For example, the packet A may be one packet or may include a plurality of packets.

For another example, as shown in FIG. 2, the second network device sends the packet B to the third network device, and a sending time range of the packet A is as follows: Another rectangle filled with slashes in FIG. 2 represents a sending time range (T2) of a packet in one period of the second network device.

It should be understood that the packet B is merely a representation of a packet sent by the second network device to the third network device, and this application does not limit a constitution of the packet B. For example, the packet B may be one packet or may include a plurality of packets.

Specifically, when a packet sending network device constantly sends packets to a packet receiving network device in a time range, the packet receiving network device constantly receives the packets in a time range.

For example, as shown in FIG. 2, when the first network device constantly sends the packet A to the third network device in the time range T1, considering that there is a shortest delay and a longest delay when the first network device sends the packet A to the third network device, a time range in which the third network device receives the packet A is represented by using a rectangle that is not filled in FIG. 2, and it indicates a time range (T1') in which the packet A arrives at the third network device.

For another example, as shown in FIG. 2, when the second network device constantly sends the packet B to the third network device in the time range T2, considering that there is a shortest delay and a longest delay when the second network device sends the packet B to the third network device, a time range in which the third network device receives the packet B is indicated by using another rectangle that is not filled in FIG. 2, and it indicates a time range (T2') in which the packet B arrives at the third network device.

Further, to ensure that all packets that are in one period and that are received by an upstream network device can be sent in one period of a downstream network device, the downstream network device needs to prepare all to-be-sent packets before a start of a sending period of the downstream network device, or otherwise, there may be a case in which it is too late to perform sending.

For example, it can be learned from FIG. 2 that all packets (referred to as the packet B) in the $5^{th}$ period (a period that is of the second network device and whose label number is 4 in FIG. 2, where the period may be referred to as a fourth period) of the second network device are sent to the third network device before a start of the $7^{th}$ period (a period that is of the third network device and whose label number is 6 in FIG. 2, where the period may be referred to as a sixth period) of the third network device (as shown in FIG. 2, a latest arrival moment of the packet B is Tb, which is before the start of the $7^{th}$ period of the third network device). Therefore, after receiving the packet B, the third network device may send the first packet in the $7^{th}$ period of the third network device.

However, a packet that is the last to arrive at the third network device in all packets (referred to as the packet A) in the $4^{th}$ period (a period that is of the first network device and whose label number is 3 in FIG. 2, where the period may be referred to as a third period) of the first network device may arrive after a start of the $6^{th}$ period (a period that is of the third network device and whose label number is 5 in FIG. 2, where the period may be referred to as a fifth period) of the third network device (as shown in FIG. 2, a latest arrival moment of the packet A is Ta, which is after the start of the $6^{th}$ period of the third network device).

Therefore, after receiving the packet A, to ensure periodic forwarding, the third network device cannot send the packet A in the $6^{th}$ period of the third network device.

The third network device may send the packet A in a next period of the $6^{th}$ period. In other words, the third network device sends the packet A in the $7^{th}$ period after receiving the packet A.

It can be learned from the foregoing description that an inbound interface of the third network device receives the packet B, and the third network device searches for an outbound interface through routing, and then maps the packet B to the $7^{th}$ period of the third network device by using a fixed mapping relationship between the $5^{th}$ period of the second network device and the $7^{th}$ period of the third network device. In this case, the $5^{th}$ period of the second network device is a latest period in ingoing periods that have mapping relationships with the $7^{th}$ period of the third network device.

Further, the inbound interface of the third network device receives the packet A, and the third network device searches for an outbound interface through routing, and then maps the packet A to the $7^{th}$ period of the third network device by using a fixed mapping relationship between the $4^{th}$ period of the first network device and the $7^{th}$ period of the third network device. In this case, the $4^{th}$ period of the first network device is an earliest period in ingoing periods that have mapping relationships with the $7^{th}$ period of the third network device.

Therefore, it can be learned from FIG. 2 that a maximum range of a receiving time of a packet to be sent in one period of the third network device is T1+T2+Δ−Δ'.

Because a uniform period is set in the network, and is marked as T, a maximum range of a receiving time of a packet to be sent in one period of the third network device is T'=2*T+Δ−Δ'.

For example, the first network device, the second network device, and the third network device that are shown in FIG. 2 may be routers or other network devices that can forward data.

Figure 3:
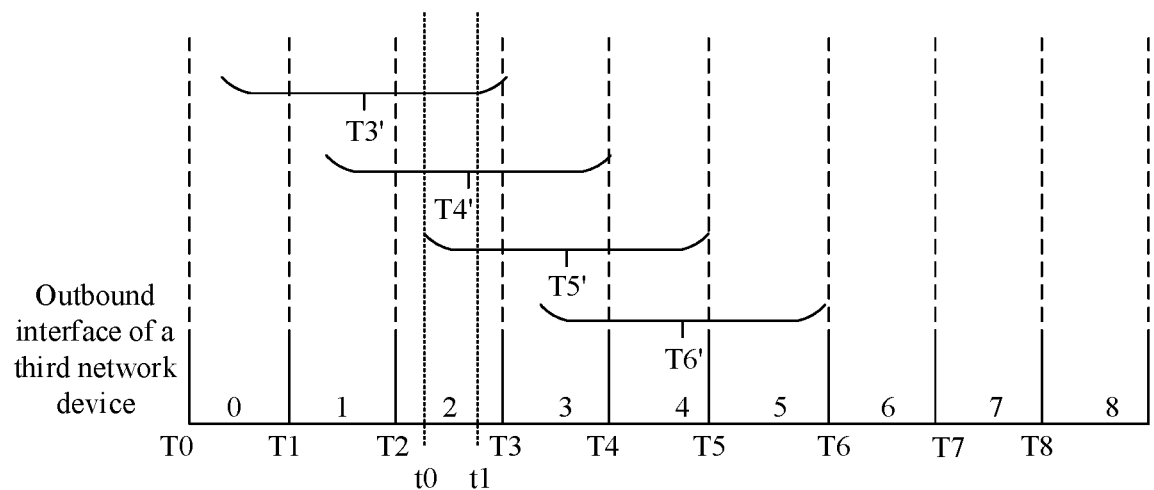
FIG. 3 is a schematic diagram of a quantity of period labels according to an embodiment of this application.
Figure 4:
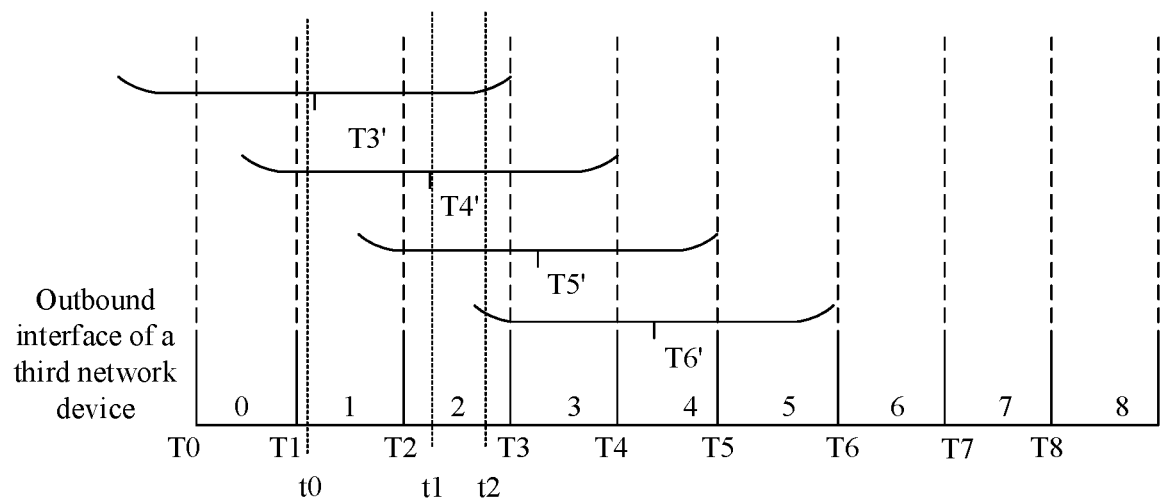
FIG. 4 is another schematic diagram of a quantity of period labels according to an embodiment of this application.

FIG. 2 mainly describes, from the perspective of a transmission jitter, a maximum range T' of a receiving time of a packet to be sent in one period, and the following briefly describes, with reference to FIG. 3 and FIG. 4, a quantity of needed label numbers of periods when a downstream network device receives packets in the plurality of periods.

FIG. 3 is a schematic diagram of a quantity of label numbers of periods according to an embodiment of this application. The schematic diagram includes an outbound interface of the third network device and receiving time windows of a plurality of periods of the outbound interface.

$T_n'$ (n=3, 4, 5, 6) represents a receiving time window of an $(n+1)^{th}$ period of the third network device.

When T'=2*T+Δ−Δ', T is T in FIG. 2, and packets are received simultaneously in at most three periods of the outbound interface of the third network device in FIG. 3. Therefore, the third network device needs three label numbers used to identify the periods of the third network device.

Specifically, the quantity of the label numbers of the periods may be briefly referred to as a quantity of period labels, which are physically a quantity of packet receiving queues.

FIG. 4 is another schematic diagram of a quantity of period labels according to an embodiment of this application. The schematic diagram includes an outbound interface of the third network device and a receiving time window of each period of the outbound interface.

$T_n'$ (n=3, 4, 5, 6) represents a receiving time window of an $(n+1)^{th}$ period of the third network device.

When T'=2*T+Δ−Δ', it is assumed that T' in FIG. 4 is greater than T in FIG. 3, and packets are received simultaneously in at most four periods of the outbound interface of the third network device in FIG. 4. Therefore, the third network device needs four label numbers used to identify the periods of the third network device.

It can be deduced from FIG. 3 and FIG. 4 that when packets are received simultaneously in at most N periods of the outbound interface of the third network device, the third network device needs N label numbers used to identify the periods of the third network device.

Specifically, N is a value obtained after T'/T is rounded up. In other words, $$N = \prod (T'/T) = \prod \left(2 + \frac{\text{jitter}}{T}\right).$$

Therefore, a value of N depends on a value of the jitter (Δ−Δ), namely, a jitter between neighboring network devices.

In a packet forwarding method in the prior art, a uniform jitter is set for an entire network, to implement packet forwarding between neighboring network devices.

The following briefly describes a method for forwarding a packet based on the uniform jitter of the entire network.

Figure 5:
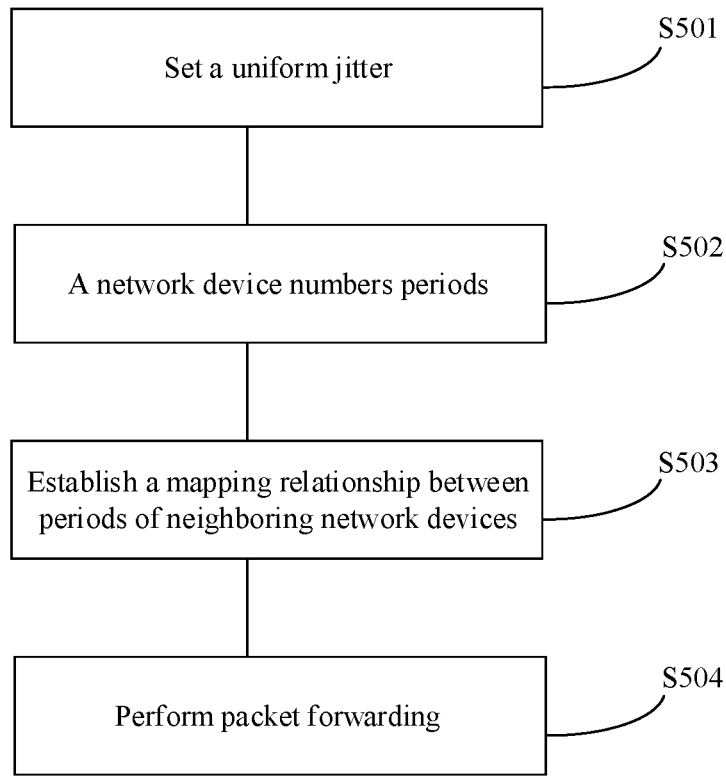
FIG. 5 is a schematic diagram of packet forwarding in the prior art.

FIG. 5 is a schematic diagram of packet forwarding in the prior art. The schematic diagram includes S501 to S504.

S501. Set a uniform jitter.

A network 100 includes a plurality of network devices (as shown in FIG. 1), and a system sets a uniform upper limit of a jitter between neighboring network devices for all network devices in the network 100.

It should be understood that when a forwarding architecture between network devices in the network 100 is a network processor (network processor, NP), an order of magnitude of a jitter introduced by other modules of the network devices is several microseconds (less than 10 µs), in other words, a jitter between neighboring network devices in the NP forwarding architecture is small.

S502. A network device numbers periods.

Each network device in the network 100 calculates, based on the jitter that is set in S501, a quantity of needed label numbers used to identify periods of the network device, and cyclically numbers the periods.

For example, the network 100 includes three network devices (a first network device, a second network device, and a third network device in FIG. 1), and $$N = \prod (T'/T) = \prod \left(2 + \frac{\text{jitter}}{T}\right) = 3.$$

Then, each of the three network devices cyclically numbers periods as 0, 1, 2, . . . .

S503. Establish a mapping relationship between periods of neighboring network devices.

An upstream neighboring network device sends a packet (carrying a period label) to a downstream neighboring network device at a start moment of a period A. After receiving the packet, the downstream neighboring network device uses, as an output period corresponding to the packet, a period in which a moment of receiving the packet (the moment of receiving the packet is a moment obtained by moving, backwards by the jitter, an actual moment at which the downstream neighboring network device receives the packet) is located. It is assumed that the corresponding output period is a period B of the downstream neighboring network device. Then, a mapping relationship between the period A and the period B is established.

Further, mapping relationships between a plurality of periods of the upstream neighboring network device and a plurality of periods of the downstream neighboring network device are established based on the mapping relationship between the period A and the period B.

For example, the first network device sends the packet A to the third network device at a start moment of the $1^{st}$ period (the label number is 0), where the packet A carries indication information of the label number 0.

After receiving the packet, A, the third network device determines that a receiving moment is Ta. It is assumed that a period in which Ta+jitter is located is the $3^{rd}$ period (a label number is 2) of the third network device.

Then, a mapping relationship between the $1^{st}$ period of the first network device and the $3^{rd}$ period of the third network device is established. Therefore, it can be learned that the $2^{nd}$ period of the first network device corresponds to the $4^{th}$ period of the third network device. In other words, all packets C sent by the first network device in the $1^{st}$ period are forwarded in the $3^{rd}$ period of the third network device, and all packets D sent by the first network device in the $2^{nd}$ period are forwarded in the $4^{th}$ period of the third network device.

Specifically, an $i^{th}$ period of the first network device corresponds to an $(i+2)^{th}$ period of the third network device.

504. Perform Packet Forwarding.

Packet forwarding between network devices is implemented based on the mapping relationship established in S503.

For example, after mapping relationships between periods of the first network device and periods of the third network device are established based on the mapping relationship between the $1^{st}$ period of the first network device and the $3^{rd}$ period of the third network device, the $3^{rd}$ period of the first network device corresponds to the $5^{th}$ period of the third network device.

Then, after receiving a packet carrying a label number of the $3^{rd}$ period of the first network device, the third network device forwards the packet in the $5^{th}$ period of the third network device.

The packet forwarding method in FIG. 5 is mainly applied to packet forwarding performed when all network devices in the network 100 use a same forwarding architecture.

Actually, all the network devices in the network 100 generally use a plurality of forwarding architectures.

For example, in addition to the NP forwarding architecture, actually, the network 100 may further include another network forwarding architecture.

For example, the network 100 includes both the NP forwarding architecture and an X86 forwarding architecture.

For the X86 forwarding architecture, an order of magnitude of a jitter introduced by another module is usually 100 μs. In other words, for the X86 forwarding architecture, a jitter between neighboring network devices is large.

It is assumed that a uniform jitter is still set for the entire network. For different network forwarding architectures, expected delays (excluding a delay between lines) of the network are as follows:

In the NP forwarding architecture, an expected delay is h*(jitter+1.5T).

It is assumed that a period is 10 μs, and jitter=10 μs. Then, the expected delay is equal to h*(jitter+1.5T)=h*(1T+1.5 T)=h*(2.5T).

In the X86 forwarding architecture, an expected delay is h*(jitter+1.5T).

It is assumed that a period is 10 μs, and jitter=100 μs. Then, the expected delay is equal to h*(jitter+1.5T)=h*(10T+1.5 T)=h*(11.5T).

3. It is assumed that the network includes both the NP forwarding architecture and the X86 forwarding architecture. To ensure that an expected delay of the X86 forwarding architecture is met, a uniform jitter set for the entire network should be 100 μs, and an expected delay is h*(11.5T).

In other words, the uniform jitter is set for the entire network. When the network 100 includes a plurality of forwarding architectures, the uniform jitter that is set meets a forwarding architecture having a longest expected delay. As a result, for a forwarding architecture having a short expected delay, a delay is excessively long, and forwarding efficiency is affected.

To resolve the foregoing problem, this application provides a period mapping method. No uniform jitter is set in the network 100. Instead, a jitter corresponding to each network device is set based on an actual status of a jitter of the network device.

An expected end-to-end delay when the entire network includes a plurality of forwarding architectures is:

$$h1*(\text{jitter\_1}+1.5T)+h2*(\text{jitter\_2}+1.5T)+h3*(\text{jitter\_3}+1.5T)+hi*(\text{jitter\_i}+1.5T), \text{ where}$$

h1 is a quantity of hops between first forwarding architectures in the plurality of forwarding architectures, h2 is a quantity of hops between second forwarding architectures in the plurality of forwarding architectures, h3 is a quantity of hops between third forwarding architectures in the plurality of forwarding architectures, hi is a quantity of hops between $i^{th}$ forwarding architectures in the plurality of forwarding architectures, jitter1 is a jitter in the first forwarding architecture, jitter2 is a jitter in the second forwarding architecture, jitter3 is a jitter in the third forwarding architecture, and jitter_i is a jitter in the $i^{th}$ forwarding architecture.

For example, in the network 100, the first network device and the second network device use the NP forwarding architecture, and the third network device uses the X86 forwarding architecture.

A packet sent in a period of the first network device is first sent to a period of the second network device. Second, the second network device sends the packet to a period of the third network device in the period of the second network device.

Then, an expected end-to-end delay of sending, by the first network device, the packet is:

h1*(jitter_1+1.5T)+h2*(jitter_2+1.5 T), where because the first network device and the second network device use the NP forwarding architecture, jitter_1=10 μs, and because the third network device uses the X86 forwarding architecture, jitter_2=100 μs.

When T=10 μs, the expected end-to-end delay is equal to 1*(2.5T)+1*(11.5T)=14T.

When a uniform jitter is set for the entire network as in the prior art, an expected end-to-end delay of sending, by the first network device, the packet is:

$$h*(\text{jitter\_2}+1.5T)=(h1+h2)*(11.5T)=23T.$$

It should be understood that it is merely an example that in the network 100, the first network device and the second network device use the NP forwarding architecture, and the third network device uses the X86 forwarding architecture, and this cannot limit the protection scope of this application. This application does not limit a quantity of forwarding architectures specifically included in the network, and a specific type of a forwarding architecture.

It can be learned through the foregoing comparison that in this embodiment of this application, when the network 100 includes a plurality of forwarding architectures, a corresponding jitter is set based on an actual status of a network device, to reduce an expected end-to-end delay.

Further, as shown in FIG. 2 to FIG. 4 that a quantity of label numbers that are needed by each network device to identify periods of the network device is set based on an actual status of a jitter of the network device.

In other words, in this embodiment of this application, quantities of label numbers needed by network devices in the network to identify periods of the network devices may be inconsistent.

Therefore, neighboring network devices having different quantities of label numbers need to successfully communicate with each other when forwarding a packet, to find a packet sending period.

This embodiment of this application can be applied to the network 100 in FIG. 1. A plurality of network devices in the network 100 perform packet forwarding based on different forwarding architectures, and jitters corresponding to the forwarding architectures are different, or jitters of a plurality of network devices in the network 100 are inconsistent due to another reason.

For example, the first network device and the second network device in FIG. 1 use the NP forwarding architecture, and the third network device uses the X86 forwarding architecture.

Further, when the network 100 includes both the NP forwarding architecture and the X86 forwarding architecture, each network device sets a corresponding jitter based on an actual capability of the network device, and calculates, based on the specified jitter, a quantity of label numbers needed by the network device to identify periods of the network device.

Numbering periods based on a quantity of corresponding label numbers used to identify the periods of a network device includes the following several cases:

Label number ranges of some network devices in the network 100 are 0 to m−1, and label number ranges of some network devices are 0 to n−1.

A network device whose label number range is 0 to m−1 may be referred to as a network device of a category A, and a network device whose label number range is 0 to n−1 may be referred to as a network device of a category B in the following, where m and n are different positive integers.

Specifically, a period mapping between different network devices includes:

a mapping between a period of a network device of the category A and a period of a network device of the category A: a mapping relationship is established between a period indicated by 0 to m−1 and a period indicated by 0 to m−1;

a mapping between a period of a network device of the category B and a period of a network device of the category B: a mapping relationship is established between a period indicated by 0 to n−1 and a period indicated by 0 to n−1;

a mapping between a period of a network device of the category A and a period of a network device of the category B: a mapping relationship is established between a period indicated by 0 to m−1 and a period indicated by 0 to n−1; and a mapping between a period of a network device of the category B and a period of a network device of the category A: a mapping relationship is established between a period indicated by 0 to n−1 and a period indicated by 0 to n−1.

When a period mapping between network devices is the mapping between the period of the network device of the category A and the period of the network device of the category A, or the mapping between the period of the network device of the category B and the period of the network device of the category B, a mapping relationship between periods of the network devices may be a mapping performed by using a solution in FIG. 5.

Figure 6:
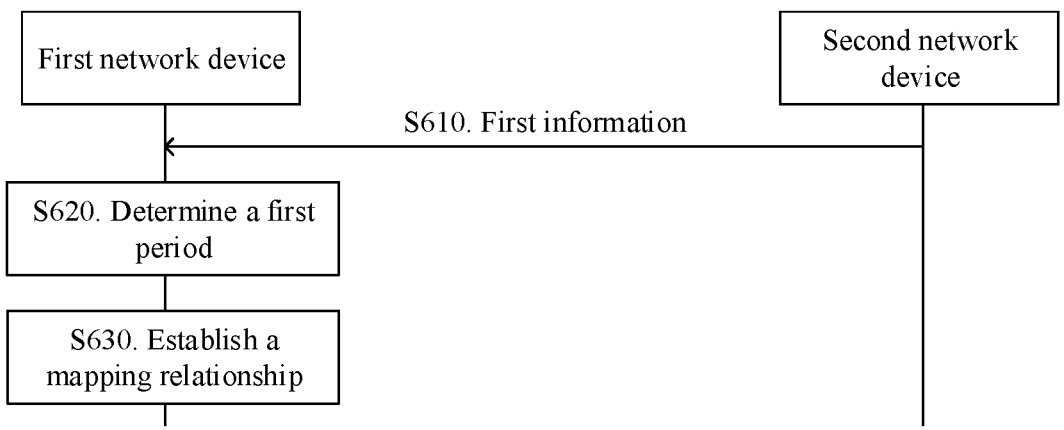
FIG. 6 is a schematic diagram of a period mapping method according to an embodiment of this application.

When a period mapping between network devices is the mapping between the period of the network device of the category A and the period of the network device of the category B, or the mapping between the period of the network device of the category B and the period of the network device of the category A, a mapping relationship between the network devices may be a mapping performed by using a solution in FIG. 6.

FIG. 6 is a schematic diagram of a period mapping method according to an embodiment of this application. The schematic diagram includes a first network device, a second network device, and S610 to S630.

It should be understood that the period mapping method shown in FIG. 6 is merely used as a possible embodiment, and cannot limit the protection scope of this application. The protection scope of this application is subject to the claims.

S610. The first network device receives first information sent by the second network device.

Specifically, in a network, the first network device is a downstream network device, and the second network device is an upstream network device. In addition, a forwarding architecture of the first network device is inconsistent with a forwarding architecture of the second network device, or a forwarding architecture of the first network device is consistent with a forwarding architecture of the second network device, but a jitter of the first network device is inconsistent with a jitter of the second network device due to another reason. This application does not limit a reason causing the inconsistency between the jitter of the first network device and the jitter of the second network device, and the inconsistency may be caused by hardware or software.

For example, the first network device uses an NP forwarding architecture, and the second network device uses an X86 forwarding architecture; or the first network device uses an X86 forwarding architecture, and the second network device uses an NP forwarding architecture; or the first network device uses an application-specific integrated circuit (application specific integrated circuit, ASIC) forwarding architecture, and the second network device uses an NP forwarding architecture; or both the first network device and the second network device use an X86 forwarding architecture, but have inconsistent jitters or the like.

It should be understood that this embodiment of this application does not limit a specific forwarding architecture of the first network device, and the first network device may use any forwarding architecture in the prior art. Similarly, this embodiment of this application does not limit a specific forwarding architecture of the second network device, and the second network device may use any forwarding architecture in the prior art.

Specifically, the first information carries a first number, the first number is a number of the $1^{st}$ period of the second network device, and is used to identify the $1^{st}$ period of the second network device, and the first number includes a first label number and a first group number.

Optionally, the $1^{st}$ period of the second network device is a period in which a start moment of a super frame of the second network device is located.

Optionally, that the first information carries the first number includes: p bits of the first information are used to indicate a value of the first label number; and q bits of the first information are used to indicate a value of the first group number, where p and q are positive integers.

For example, when a network protocol between the first network device and the second network device is internet protocol (internet protocol, IP) version 4 (briefly referred to as IPv4), the first information may be:

a differentiated services code point (differentiated services code point, DSCP) and explicit congestion notification (explicit congestion notification, ECN) field, where the field includes 8 bits in total, a most significant bit is set to 1, and it indicates that a differentiated internet protocol (differentiated internet protocol, DIP) function is enabled.

Specifically, a label number is filled in p least significant bits of the DSCP and ECN field, and a group number is filled in q bits more significant than the p least significant bits.

When the number of the $1^{st}$ period of the second network device is <0, 0>, a binary value of the field is (10000000).

For another example, when a network protocol between the first network device and the second network device is internet protocol (internet protocol, IP) version 6 (briefly referred to as IPv6), the first information may be a hop-by-hop transmission (hop by hop) extension header.

A number of a period is placed in a hop-by-hop transmission (hop by hop) extension header, and binary value representation of a label number and a group number is the same as that in IPv4. Details are not described herein again.

It should be understood that, that the first information is the DSCP and ECN field or the hop by hop extension header is merely an example, and this cannot limit the protection scope of this application. In this embodiment of this application, the first information may be other indication information provided that the indication information can be used to carry the first number and indicate values of the first label number and the first group number.

It should be further understood that, specifically, p bits of the first information are used to indicate that the first label number is related to a maximum label number, and a maximum value of a decimal value represented by a binary value of the p bits only needs to be greater than or equal to a maximum label number in label numbers of periods of the second network device. For example, the maximum label number in the label numbers of the periods of the second network device is 10, and then p only needs to be greater than or equal to 4.

Specifically, q bits of the first information are used to indicate that the first group number is related to a maximum group number, and a maximum value of a decimal value represented by a binary value of the q bits only needs to be greater than or equal to a maximum group number in the label numbers of the periods of the second network device.

Optionally, the first information may be understood as a probe packet. In other words, the first information is a packet used to establish period mapping relationships between periods of the first network device and the periods of the second network device.

Specifically, to meet a periodic forwarding condition, a moment at which the second network device sends the first information is a start moment of the $1^{st}$ period of the second network device. In this way, it can be ensured that all packets sent by the second network device to the first network device in the $1^{st}$ period can be sent in a first period of the first network device.

It should be understood that the second network device numbers each period of the second network device before sending the first information to the first network device, so that the first information carries the first number.

Specifically, the second network device needs to learn a quantity of the label numbers used to identify the periods of the second network device and a quantity of label numbers used to identify the periods of the first network device, to number each period of the second network device.

Figure 7:
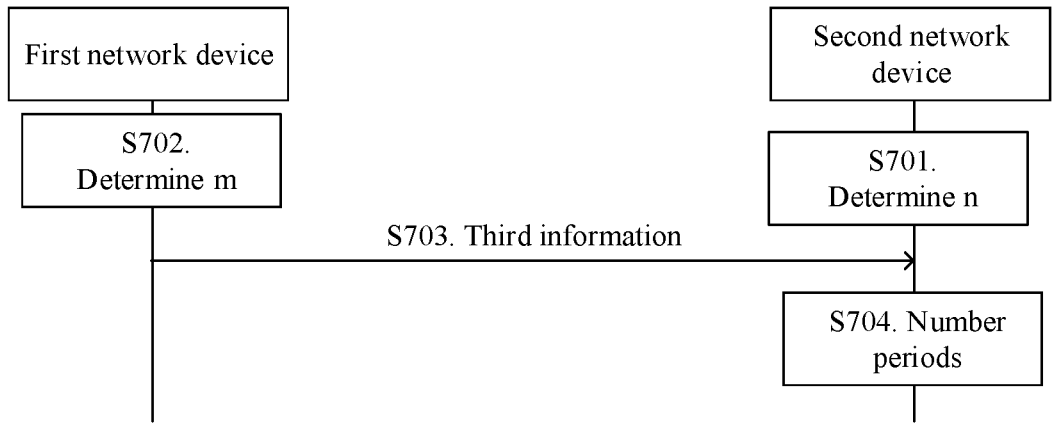
FIG. 7 is a schematic diagram of a method for numbering, by a second network device, periods according to an embodiment of this application.

The following describes, in detail with reference to FIG. 7, how the second network device numbers each period of the second network device.

FIG. 7 is a schematic diagram of a method for numbering, by a second network device, the periods according to an embodiment of this application. The schematic diagram includes S701 to S704.

S701. The second network device determines n.

Specifically, the second network device determines n based on a second jitter jitter, where n is the quantity of the label numbers used to identify the periods of the second network device, and the second jitter is a jitter of the second network device.

Optionally, the jitter of the second network device may be a delay from an inbound interface to an outbound interface of the second network device; or the jitter of the second network device is a delay between modules of the second network device.

It should be understood that after a forwarding architecture to which the second network device belongs is determined, the jitter of the second network device can be determined based on an empirical value.

This embodiment of this application does not limit how to determine the jitter of the second network device, and the jitter of the second network device may be determined by using any method for determining a jitter of a network device in the prior art.

For example, the second network device uses the NP forwarding architecture, and a period is set to 10 µs for the entire network. The second jitter is 10 µs. Then, a quantity of period labels of the second network device is $$n = \prod \left(2 + \frac{\text{jitter}}{T}\right) = 3.$$

Alternatively, the second network device uses the X86 forwarding architecture, and a period is set to 10 µs for the entire network. The second jitter is 100 µs. Then, a quantity of period labels of the second network device is $$n = \prod \left(2 + \frac{\text{jitter}}{T}\right) = 12.$$

S702. The first network device determines m.

Specifically, the first network device determines m based on a first jitter jitter, where m is the quantity of the label numbers used to identify the periods of the first network device, and the first jitter is a jitter of the first network device.

Optionally, the jitter of the first network device may be a delay from an inbound interface to an outbound interface of the first network device; or
the jitter of the first network device is a delay between modules of the first network device.

It should be understood that after a forwarding architecture to which the first network device belongs is determined, the jitter of the first network device can be determined based on an empirical value.

This embodiment of this application does not limit how to determine the jitter of the first network device, and the jitter of the first network device may be determined by using any method for determining a jitter of a network device in the prior art.

For example, the first network device uses the NP forwarding architecture, and a period is set to 10 µs for the entire network. The first jitter is 10 µs. Then, a quantity of period labels of the first network device is $$n = \prod \left(2 + \frac{\text{jitter}}{T}\right) = 3.$$

Alternatively, the first network device uses the X86 forwarding architecture, and a period is set to 10 µs for the entire network. The first jitter is 100 µs. Then, a quantity of period labels of the first network device is $$n = \prod \left(2 + \frac{\text{jitter}}{T}\right) = 12.$$

S703. The first network device sends third information to the second network device.

The third information indicates m in S702.

Optionally, in some embodiments, the third information may be obtained in the following manner: The first network device constructs, on each interface, one internet protocol (internet protocol, IP) packet whose time to live (time to live, TTL) is 255, sends the packet to the second network device, and fills m in a field that is of the packet and that is used to indicate the quantity of the label numbers used to identify the periods of the first network device.

For example, when a network protocol between the first network device and the second network device is IPv4, the third information is a DSCP and ECN field.

The DSCP and ECN field includes 8 bits in total. A most significant bit is set to 1, and it indicates that a DIP function is enabled. The quantity of the label numbers used to identify the periods of the first network device is filled in p least significant bits, m=3, and a binary value of the DSCP and ECN field is (10000011).

When a network protocol between the first network device and the second network device is IPv6, m is placed in a hop by hop extension header, and a binary value is the same as that in IPv4. Details are not described herein again.

Optionally, in some other embodiments, the third information may be obtained in the following manner: The first network device constructs, on each interface, one internet protocol (internet protocol, IP) packet whose time to live (time to live, TTL) is 255, sends the packet to the second network device, and fills a maximum value in a range of the label numbers of the periods of the first network device in a field that is of the packet and that is used to indicate the quantity of the label numbers used to identify the periods of the first network device.

For example, the third information is the DSCP and ECN field, and the maximum value of the label numbers of the periods is filled in p least significant bits of the DSCP and ECN field. When m=3, and a range of the label numbers of the periods of the second network device is 0 to 2, a binary value of the DSCP and ECN field is (10000010). Alternatively, when m=3, and a range of the label numbers of the periods of the second network device is 1 to 3, a binary value of the DSCP and ECN field is (10000011).

Optionally, in some other embodiments, the third information may be indication information that is sent by the first network device to the second network device before the first network device and the second network device perform packet forwarding, and the third information carries m or m−1.

It should be understood that this embodiment of this application does not limit a specific form of the third information provided that the third information can be used to notify the second network device of the quantity (m) of the label numbers used to identify the periods of the first network device.

S704. The second network device numbers periods.

After receiving the third information in S703, the second network device numbers each period of the second network device based on m and n.

Specifically, that the second network device numbers each period of the second network device based on m and n includes the following steps:

The second network device calculates a least common multiple L of m and n.

Specifically, L*T is referred to as one super frame of the second network device, and one super frame includes L periods.

The second network device determines, based on L and n, a quantity y of groups into which the periods of the second network device can be divided.

Specifically, y=L/n. All periods in one super frame of the second network device are divided into y groups, and each group of periods includes n periods.

The second network device numbers each period of the second network device based on n and y, where the number of each period of the second network device includes a label number and a group number.

Optionally, in some embodiments, the second network device may calculate a common multiple $L_x$ of m and n based on m and n, and number the periods based on any common multiple of m and n.

In this application, the least common multiple L of m and n is selected, to improve packet forwarding performance to the greatest extent.

For example, the first network device uses the NP forwarding architecture, and the second network device uses the X86 forwarding architecture.

Then, in S701 in FIG. 7, the second network device determines that $$n = \prod \left(2 + \frac{\text{jitter}}{T}\right) = 12,$$

and in S702 in FIG. 7, the first network device determines that $$m = \prod \left(2 + \frac{\text{jitter}}{T}\right) = 3.$$

Further, the second network device calculates that the least common multiple L of m and n is 12.

Then, y=L/n=1. In other words, all periods of the second network device are divided into one group, and the group of periods includes 12 periods.

The second network device numbers each period of the second network device based on 12 and 1, where the number of each period of the second network device includes the label number and the group number.

Specifically, when the second network device numbers each period of the second network device, a range of the label numbers in the numbers of the periods of the second network device may be 0 to n−1, and the group numbers may be 0 to y−1; or a range of the label numbers in the numbers of the periods of the second network device may be 1 to n, and the group numbers may be 1 to y.

It should be understood that this application does not limit a specific range of the label numbers and a specific range of the group numbers, and the ranges each may be any range agreed on by the first network device and the second network device. In other words, the first network device and the second network device only need to use a numbering manner that can be identified by each other.

For example, when y=1, and n=12, the numbers of the periods of the second network device may be:

the number of the $1^{st}$ period of the second network device is <0, 0>;

a number of the $2^{nd}$ period of the second network device is <0, 1>;

a number of the 3rd period of the second network device is <0, 2>;

. . .

a number of a $j^{th}$ period of the second network device is <i, j−1>, where i=0, j is a positive integer, and j=1, 2, 3, . . . , 12.

It can be learned from the foregoing description that the number of each period of the second network device is a two-dimensional array, the first element in the two-dimensional array is used to represent the label number of the period, and the second element in the two-dimensional array is used to represent the group number of the period.

It should be understood that, that the second network device numbers each period of the second network device is merely an example, and there is another numbering manner.

For example, when values of m and n are different; or the second element in the two-dimensional array is used to indicate the label number of the period, and the first element in the two-dimensional array is used to indicate the group number of the period; or a different range of label numbers is used and/or a different range of group numbers is used, and details are not described herein again.

After receiving the first information sent by the second network device, and obtaining the number of the $1^{st}$ period of the second network device, the first network device performs S620.

S620. The first network device determines a first period.

Specifically, after receiving the first information, the first network device determines the first period that can be used to send the first information. A second number of the first period includes a second label number and a second group number.

It should be understood that the first period determined by the first network device can be used to send the first information, but this application does not impose such a limitation that the first network device should forward the first information to a downstream device of the first network device.

In other words, after the first network device receives the first information, and the determined first period can be used to send the first information, when the first information needs to be forwarded to another network device, the first network device needs to forward the first information to a downstream network device in the first period; or when the first information does not need to be forwarded to another network device, the first network device uses the first period determined for the first information.

It should be further understood that a reason why the first network device can determine the second number of the first period after determining the first period that can be used to send the first information is that the first network device numbers each period of the first network device before receiving the first information.

Specifically, the first network device needs to learn the quantity of the label numbers used to identify the periods of the first network device and the quantity of the label numbers used to identify the periods of the second network device, to number each period of the first network device.

Figure 8:
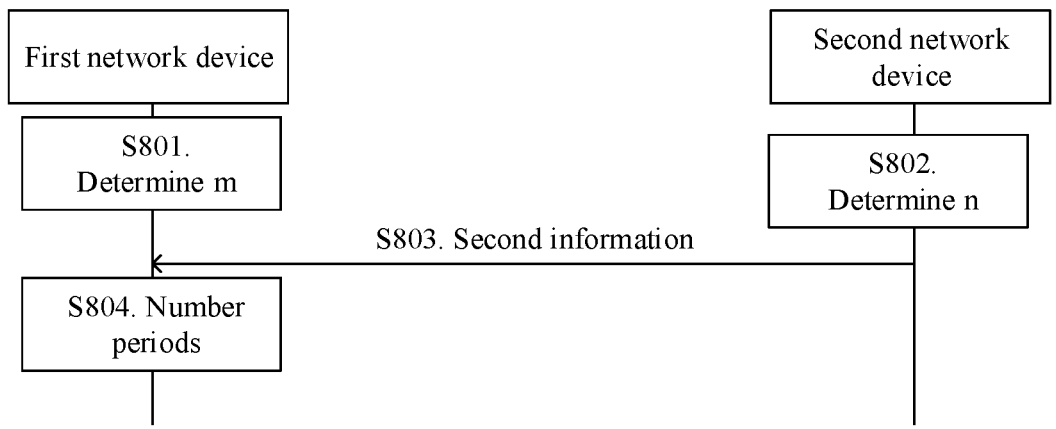
FIG. 8 is a schematic diagram of a method for numbering, by a first network device, periods according to an embodiment of this application.

The following describes, in detail with reference to FIG. 8, how the first network device numbers each period of the first network device.

FIG. 8 is a schematic diagram of a method for numbering, by the first network device, the periods according to an embodiment of this application. The schematic diagram includes S801 to S804.

S802. The first network device determines m.

Specifically, the first network device determines m based on the first jitter jitter. This is similar to S702 in FIG. 7, and details are not described herein again.

S802. The second network device determines n.

Specifically, the second network device determines n based on the second jitter jitter. This is similar to S701 in FIG. 7, and details are not described herein again.

S803. The first network device receives second information sent by the second network device.

The second information indicates n in S802.

Optionally, in some other embodiments, the second information may be obtained in the following manner: The second network device constructs, on each interface, one internet protocol (internet protocol, IP) packet whose time to live (time to live, TTL) is 255, sends the packet to the first network device, and fills n in a field that is of the packet and that is used to indicate the quantity of the label numbers used to identify the periods of the second network device.

For example, when a network protocol between the first network device and the second network device is IPv4, the second information is a DSCP and ECN field.

The DSCP and ECN field includes 8 bits in total. A most significant bit is set to 1, and it indicates that a DIP function is enabled. The quantity of the label numbers used to identify the periods of the second network device is filled in p least significant bits, n=12, and a binary value of the DSCP and ECN field is (10001100).

When a network protocol between the first network device and the second network device is IPv6, n is placed in a hop by hop extension header, and a binary value is the same as that in IPv4. Details are not described herein again.

Optionally, in some other embodiments, the second information may be obtained in the following manner: The second network device constructs, on each interface, one internet protocol (internet protocol, IP) packet whose time to live (time to live, TTL) is 255, sends the packet to the first network device, and fills a maximum value in a range of the label numbers of the periods of the second network device in a field that is of the packet and that is used to indicate the quantity of the label numbers used to identify the periods of the second network device.

For example, the second information is the DSCP and ECN field, and the maximum value of the label numbers of the periods is filled in p least significant bits of the DSCP and ECN field. When n=12, and a range of the label numbers of the periods of the second network device is 0 to 11, a binary value of the DSCP and ECN field is (10001011). Alternatively, when n=12, and a range of the label numbers of the periods of the second network device is 1 to 12, a binary value of the DSCP and ECN field is (10001100).

Optionally, in some other embodiments, the second information may be indication information that is sent by the second network device to the first network device before the second network device and the first network device perform packet forwarding, and the second information carries n or n−1.

It should be understood that this embodiment of this application does not limit a specific form of the second information provided that the second information can be used to notify the first network device of the quantity (n) of the label numbers used to identify the periods of the second network device.

S804. The first network device numbers the periods.

After receiving the second information in S803, the first network device numbers each period of the first network device based on m and n.

Specifically, that the first network device numbers each period of the first network device based on m and n includes the following steps:

The first network device calculates a least common multiple L of m and n.

Specifically, L*T is referred to as one super frame of the first network device. A size of one super frame of the first network device is equal to a size of one super frame of the second network device. In other words, the quantity of the periods of the first network device in one super frame is equal to the quantity of the periods of the second network device in one super frame, and only the numbers of the periods are different.

The first network device determines, based on L and m, a quantity x of groups into which the periods of the second network device can be divided.

Specifically, x=L/m. All periods in one super frame of the first network device are divided into x groups, and each group of periods includes m periods.

The first network device numbers each period of the first network device based on m and x, where the number of each period of the first network device includes a label number and a group number.

Optionally, in some embodiments, the first network device may calculate a common multiple $L_x$ of m and n based on m and n, and number the periods based on any common multiple of m and n.

In this application, the least common multiple L of m and n is selected, to improve packet forwarding performance to the greatest extent.

For example, the first network device uses the NP forwarding architecture, and the second network device uses the X86 forwarding architecture.

Then, in S801 in FIG. 8, the first network device determines that $$m = \prod \left(2 + \frac{\text{jitter}}{T}\right) = 3,$$

and in S802 in FIG. 8, the second network device determines that $$n = \prod \left(2 + \frac{\text{jitter}}{T}\right) = 12.$$

Further, the first network device calculates that the least common multiple L of m and n is 12.

Then, x=L/m=4. In other words, all periods of the first network device are divided into four groups, and each group of periods includes three periods.

The first network device numbers each period of the first network device based on 3 and 4, where the number of each period of the first network device includes the label number and the group number.

Specifically, when the first network device numbers each period of the first network device, a range of the label numbers in the numbers of the periods of the first network device may be 0 to m−1, and the group numbers may be 0 to x−1; or a range of the label numbers in the numbers of the periods of the first network device may be 1 to m, and the group numbers may be 1 to x.

It should be understood that this application does not limit a specific range of the label numbers and a specific range of the group numbers, and the ranges each may be any range agreed on by the first network device and the second network device.

For example, when x=4, and m=3, the numbers of the periods of the first network device in one super frame may be:

a number of the $1^{st}$ period of the first network device is <0, 0>;

a number of the $2^{nd}$ period of the first network device is <0, 1>;

a number of the $3^{rd}$ period of the first network device is <0, 2>;

a number of the $4^{th}$ period of the first network device is <1, 0>;

. . .

a number of a $k^{th}$ period of the second network device is <i, j>, where i=0, 1, 2, 3, j=0, 1, 2, and k=1, 2, 3, . . . , 12. The numbers of the periods in one super frame are described above, and the periods in each super frame are cyclically numbered in this manner.

It can be learned from the foregoing description that the number of each period of the first network device is a two-dimensional array, the first element in the two-dimensional array is used to represent the label number of the period, and the second element in the two-dimensional array is used to represent the group number of the period.

It should be understood that, that the first network device numbers each period of the second network device is merely an example, and there is another numbering manner.

For example, when values of m and n are different; or the second element in the two-dimensional array is used to indicate the label number of the period, and the first element in the two-dimensional array is used to indicate the group number of the period; or a different range of label numbers is used and/or a different range of group numbers is used, and details are not described herein again.

It should be understood that as shown in FIG. 7 and FIG. 8, a network device obtains a quantity of label numbers that are of the network device and that are used to identify periods and a quantity of label numbers that are of a peer end network device and that are used to identify periods, and calculates a least common multiple of the quantities of the label numbers used to identify the periods; and calculates, based on the least common multiple, a quantity of groups into which all periods in one super frame of the network device can be divided, where one super frame includes L (the least common multiple) periods. Therefore, the method for cyclically numbering the periods based on the array and the quantity of label numbers used to identify the periods may be further applied to another scenario. In this application, that the method is applied to period mapping is merely an example.

Specifically, that the first network device determines that the first information is sent in the first period includes:

determining, by the first network device based on a first moment and the first jitter jitter, that the first information is sent in the first period, where the first moment is a moment at which the first network device receives the first information, and the first jitter is a jitter of the first network device.

Specifically, the first period is a period to which the first moment plus the first jitter jitter belongs.

For example, the first network device receives the first information at a moment t1, the first jitter is 10 μs, and a system period is 10 μs. Then, a period in which the moment t1 deviated backwards by one period is located is the first period.

Optionally, FIG. 6 further includes S630: The first network device establishes a mapping relationship.

For example, because the first label number and the first group number meet a mapping relationship with the second label number and the second group number, the first network device can establish mapping relationships between the numbers of the plurality of periods of the first network device and the numbers of the plurality of periods of the second network device based on the mapping relationship.

It may be understood that, that the first label number and the first group number meet the mapping relationship with the second label number and the second group number means that the $1^{st}$ period of the second network device meets the mapping relationship with the first period of the first network device. It indicates that each period of the first network device meets the mapping relationship with each period of the second network device.

Specifically, the mapping relationship may be an offset. In other words, the $1^{st}$ period of the second network device plus the offset corresponds to the first period of the first network device.

It should be understood that, that the first network device establishes the mapping relationships between the numbers of the plurality of periods of the first network device and the numbers of the plurality of periods of the second network device based on the mapping relationship is merely an example. The first network device may further directly forward a received packet based on the mapping relationship.

For example, the mapping relationship is an offset. After receiving a packet sent by the second network device, after deviating a packet sending period by the offset based on a number of the packet sending period, the first network device obtains a period that is of the first network device and that is used to forward the packet. In this case, the first network device does not need to establish the mapping relationships between all periods of the first network device and all periods of the second network device, and store the mapping relationships, but only needs to obtain, based on the offset after receiving the packet, the period used to forward the packet, to save storage space of the first network device.

For example, the mapping relationships between the numbers of the plurality of periods of the first network device and the numbers of the plurality of periods of the second network device are one-to-one mapping relationships.

For example, the first network device uses the NP forwarding architecture, and the second network device uses the X86 forwarding architecture.

The number of the $1^{st}$ period of the second network device is <0, 0>. In other words, the first label number is equal to 0, and the first group number is equal to 0. The first network device receives the first information at the moment t1, where the moment t1 is located in the $2^{nd}$ period of the first network device, and the number of the $1^{st}$ period of the first network device is <0, 1>. It may be determined that a first offset is one period.

That the first network device determines the first period based on the moment t1 and the first jitter after determining the moment t1 includes the following steps:

In this embodiment, the first network device uses the NP forwarding architecture, the first jitter is set to 10 μs, and when the period T for the entire network is 10 μs, a value of the first jitter is one period T.

Specifically, the moment t1 is deviated backwards by one period, to obtain the first period. Then, the first period is the $3^{rd}$ period of the first network device, and the number of the $1^{st}$ period of the first network device is <0, 2>.

Then, it can be learned that a total offset is two periods. In this case, one-to-one mapping relationships between the numbers of the plurality of periods of the first network device and the numbers of the plurality of periods of the second network device are shown in Table 1.

TABLE 1

| Mapping table | | | |
| --- | --- | --- | --- |
| Source group number | Source label number | Destination group number | Destination label number |
| 0 | 0 | 0 | 2 |
| 0 | 1 | 1 | 0 |
| 0 | 2 | 1 | 1 |
| 0 | 3 | 1 | 2 |
| 0 | 4 | 2 | 0 |
| 0 | 5 | 2 | 1 |
| 0 | 6 | 2 | 2 |
| 0 | 7 | 3 | 0 |
| 0 | 8 | 3 | 1 |
| 0 | 9 | 3 | 2 |
| 0 | 10 | 0 | 0 |
| 0 | 11 | 0 | 1 |

Because the first network device is a packet receiving network device, and the second network device is a packet sending network device, in Table 1, the source group number is a group number in a number of a period of the second network device, the source label number is a label number in the number of the period of the second network device, the destination group number is a group number in a number of a period of the first network device, and the destination label number is a label number in the number of the period of the first network device.

Figure 9:
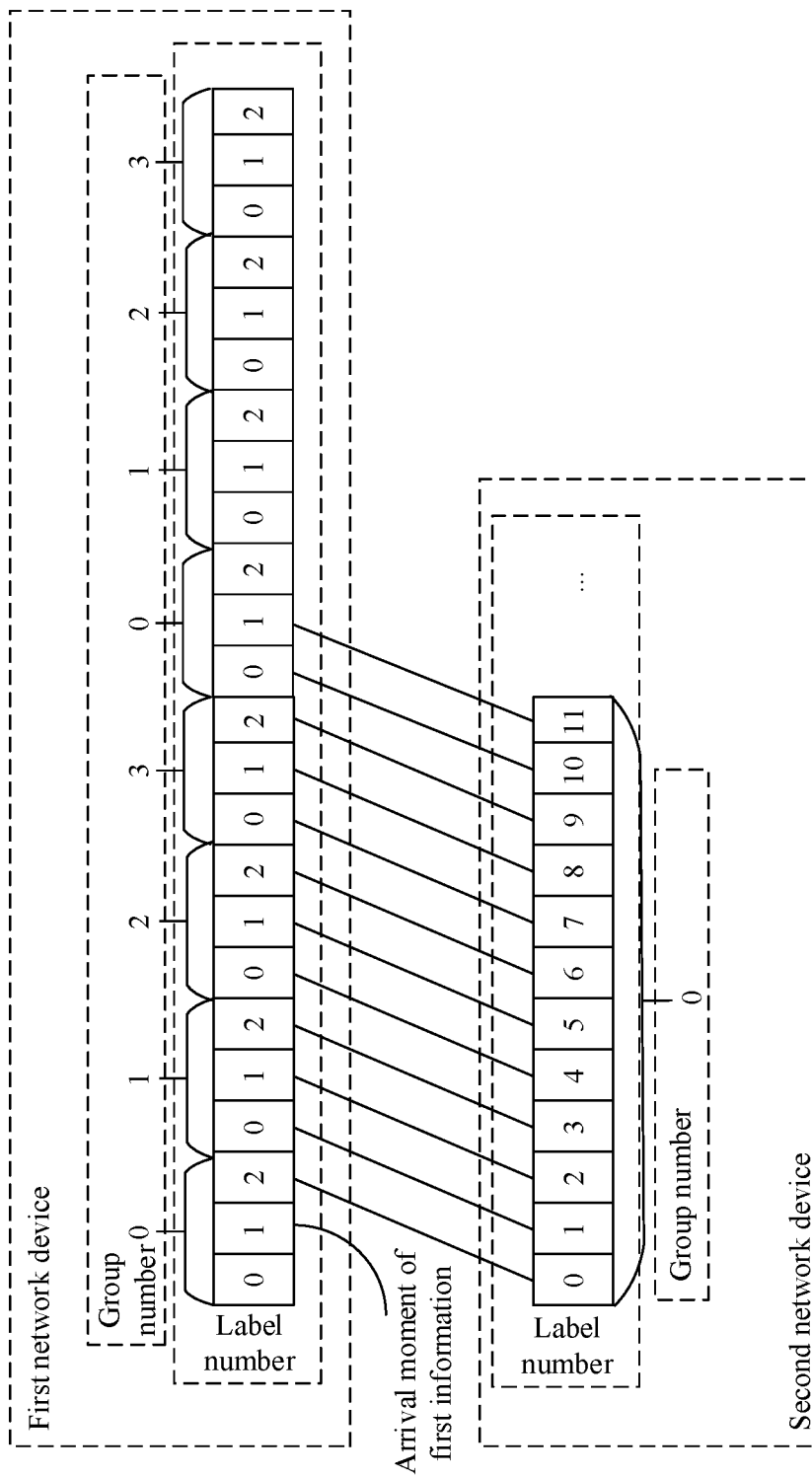
FIG. 9 is a schematic diagram of a period mapping according to an embodiment of this application.

Correspondences between the plurality of periods of the first network device and the plurality of periods of the second network device are shown in FIG. 9.

FIG. 9 is a schematic diagram of a period mapping according to an embodiment of this application.

Figure 10:
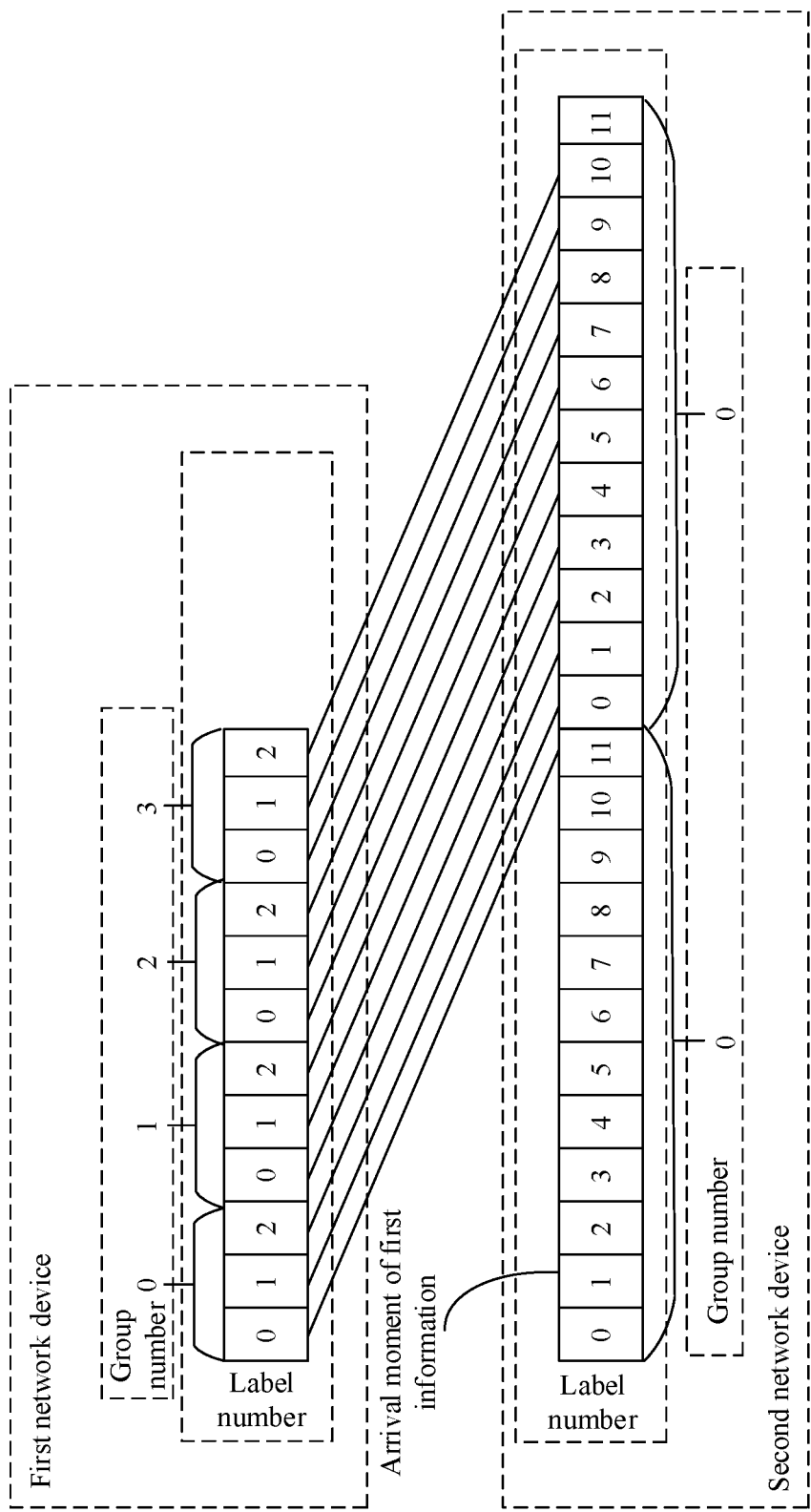
FIG. 10 is a schematic diagram of another period mapping according to an embodiment of this application.

For another example, when the first network device in FIG. 9 is an upstream network device, and the second network device is a downstream network device, the correspondences between the plurality of periods of the first network device and the plurality of periods of the second network device may be shown in FIG. 10.

FIG. 10 is a schematic diagram of another period mapping according to an embodiment of this application.

The number of the $1^{st}$ period of the first network device is <0, 0>. In other words, the first label number is equal to 0, and the first group number is equal to 0. The second network device receives the first information at the moment t1, where the moment t1 is located in the second period of the second network device, the number of the $1^{st}$ period of the second network device is <0, 1>, and a first offset is one period.

Because the jitter of the second network device is 10 T, the second network device determines that the first period is obtained by deviating the moment t1 backwards by 10 periods.

Then, the first period is the $12^{th}$ period of the second network device, and a number of the $12^{th}$ period of the second network device is <0, 11>.

It may be learned that the total offset is one period plus 10 periods, namely, 11 periods in total.

It should be understood that the schematic diagrams of the period mappings in FIG. 9 and FIG. 10 are merely examples, and cannot limit the protection scope of this application. The period mapping method in FIG. 6 of this application may be further applied to a network device using another forwarding architecture.

The following describes, with reference to a specific embodiment, a specific implementation when the period mapping method in this embodiment of this application is used to forward a packet.

Figure 11:
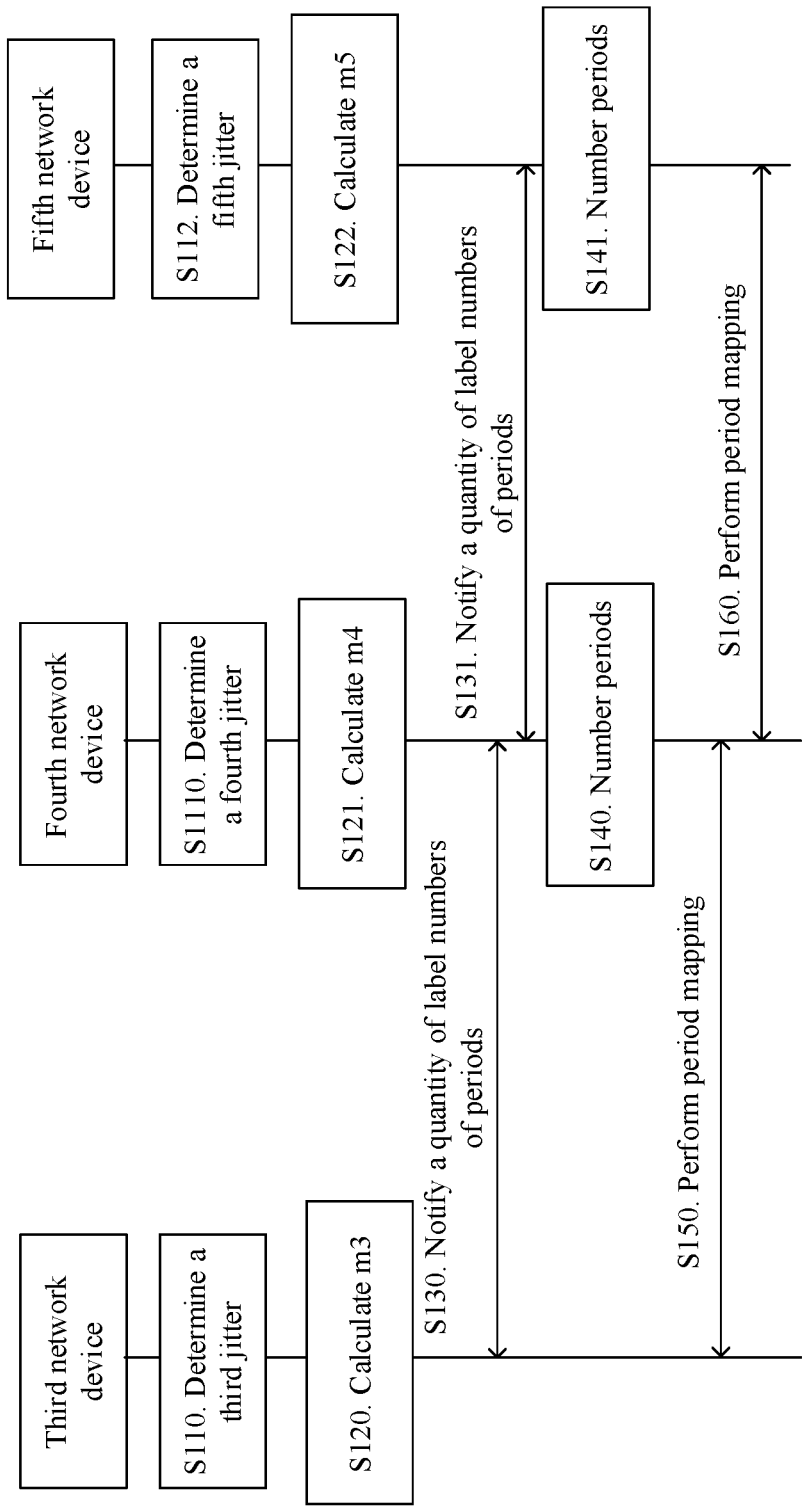
FIG. 11 is a schematic diagram of a specific embodiment of this application.

FIG. 11 is a schematic diagram of a specific embodiment of this application. The specific embodiment includes a third network device, a fourth network device, and a fifth network device.

Specifically, the third network device, the fourth network device, and the fifth network device are any three network devices in a network. The fifth network device is a downstream network device of the third network device and the fourth network device. A value of a period in the network is 10 μs.

S110. The third network device determines a third jitter.

For example, the third network device uses an NP forwarding architecture, and the third jitter is 10 μs.

S111. The fourth network device determines a fourth jitter.

For example, the fourth network device uses an NP forwarding architecture, and the fourth jitter is 10 μs.

S112. The fifth network device determines a fifth jitter.

For example, the fifth network device uses the NP forwarding architecture, and the fifth jitter is 80 μs.

S120. The third network device determines m3.

m3 is a quantity of label numbers used to identify periods of the third network device.

Specifically, $$m3 = \left\lceil \left(2 + \frac{\text{jitter}}{T}\right) \right\rceil = 3.$$

S121. The fourth network device determines m4.

m4 is a quantity of label numbers used to identify periods of the fourth network device.

Specifically, $$m4 = \left\lceil \left(2 + \frac{\text{jitter}}{T}\right) \right\rceil = 3.$$

S122. The fifth network device determines m5.

m5 is a quantity of label numbers used to identify periods of the fourth network device.

Specifically, $$m5 = \left\lceil \left(2 + \frac{\text{jitter}}{T}\right) \right\rceil = 10.$$

S130. The third network device and the fourth network device notify each other of the quantities of the label numbers of the periods.

This specifically includes the following steps:

The third network device constructs, on each interface, an IP packet whose TTL is 255, sends the packet to the fourth network device, and fills m3 in a label field.

For example, when a network protocol between the third network device and the fourth network device is IPv4, a packet used to notify each of the third network device and the fourth network device of the quantity of the label numbers of the periods may be a DSCP and ECN field, and includes 8 bits in total. A most significant bit is set to 1, and it indicates that a DIP function is enabled. The quantity of the label numbers used to identify the periods of the third network device is filled in p least significant bits, m3=3, and a binary value of the DSCP and ECN field is (10000011).

When a network protocol between the third network device and the fourth network device is IPv6, m3 is placed in a hop by hop extension header, and a binary value is the same as that in IPv4.

For another example, a maximum value of the label numbers of the periods is filled in p least significant bits of the DSCP and ECN field. When m3=3, and a range of the label numbers of the periods of the third network device is 0 to 2, a binary value of the DSCP and ECN field is (10000010). Alternatively, when m3=3, and a range of the label numbers of the periods of the third network device is 1 to 3, a binary value of the DSCP and ECN field is (10000011).

The fourth network device constructs, on each interface, an IP packet whose TTL is 255, sends the packet to the third network device, and fills a label number in a label field.

For example, when a network protocol between the third network device and the fourth network device is IPv4, the DSCP and ECN field is the label field, and includes 8 bits in total. A most significant bit is set to 1, and it indicates that a DIP function is enabled. The quantity of the label numbers used to identify the periods of the fourth network device is filled in a least significant bit, m4=3, and a binary value of the field is (10000011).

When a network protocol between the third network device and the fourth network device is IPv6, m4 is placed in a hop by hop extension header, and a binary value is the same as that in IPv4.

S131. The fourth network device and the fifth network device notify each other of the quantities of the label numbers of the periods.

This specifically includes the following steps:

The fourth network device constructs, on each interface, an IP packet whose TTL is 255, sends the packet to the fifth network device, and fills the label number in a label field.

For example, when a network protocol between the fourth network device and the fifth network device is IPv4, the DSCP and ECN field includes 8 bits in total. A most significant bit is set to 1, and it indicates that a DIP function is enabled. The quantity of the label numbers used to identify the periods of the fourth network device is filled in a least significant bit, m4=3, and a binary value of the field is (10000011).

When a network protocol between the fourth network device and the fifth network device is IPv6, m3 is placed in a hop by hop extension header, and a binary value is the same as that in IPv4.

The fifth network device constructs, on each interface, an IP packet whose TTL is 255, sends the packet to the fourth network device, and fills the label number in a label field.

For example, when a network protocol between the fifth network device and the fourth network device is IPv4, the DSCP and ECN field includes 8 bits in total. A most significant bit is set to 1, and it indicates that a DIP function is enabled. The quantity of the label numbers used to identify the periods of the fifth network device is filled in a least significant bit, m5=10, and a binary value of the field is (10001010).

When a network protocol between the fifth network device and the fourth network device is IPv6, m5 is placed in a hop by hop extension header, and a binary value is the same as that in IPv4.

S140. The fourth network device numbers the periods.

Specifically, the fourth network device numbers each period of the fourth network device based on m4 and m5.

Because m4=3, and m5=10, the fourth network device calculates a common multiple L1 of m4 and m5, and determines, based on L1 and m4, a quantity x1 of groups into which the periods of the fourth network device can be divided:

$$x1=L1/m4=30/3=10.$$

The fourth network device numbers each period of the fourth network device based on m4 and x1. Specifically, the number of each period of the fourth network device includes a label number and a group number.

Optionally, the label number is one of 0 to m4−1, and the group number is one of 0 to x1−1.

For example, a number of the $1^{st}$ period of the fourth network device is (0, 0), a number of the $2^{nd}$ period of the fourth network device is (1, 0), a number of the $3^{rd}$ period of the fourth network device is (2, 0), a number of the $4^{th}$ period of the fourth network device is (0, 1), . . . .

Figure 12:
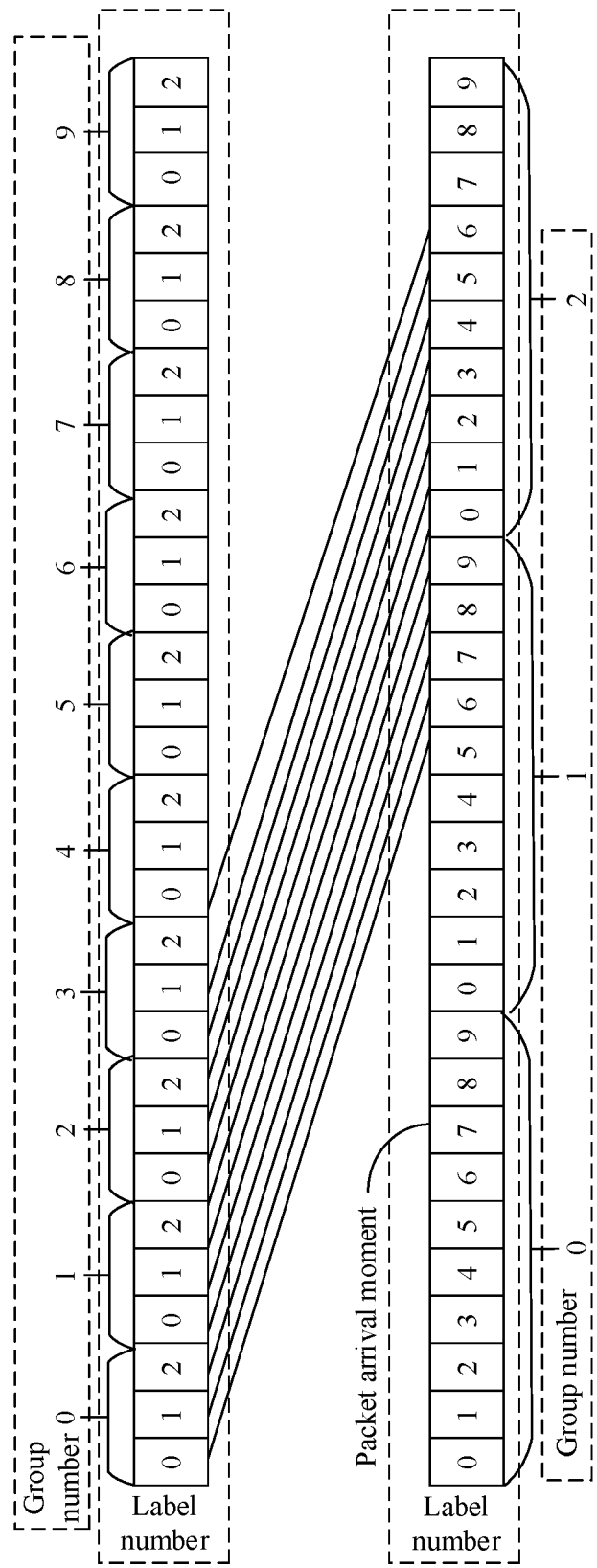
FIG. 12 is a schematic diagram of still another period mapping according to an embodiment of this application.

Specifically, the number of each period of the fourth network device is shown in the first line of FIG. 12. FIG. 12 is a schematic diagram of still another period mapping according to an embodiment of this application.

Optionally, the label number is one of 1 to m4, and the group number is one of 1 to x1.

For example, the number of the $1^{st}$ period of the fourth network device is (1, 1), the number of the $2^{nd}$ period of the fourth network device is (2, 1), the number of the $3^{rd}$ period of the fourth network device is (3, 1), the number of the $4^{th}$ period of the fourth network device is (1, 2), . . . .

Figure 13:
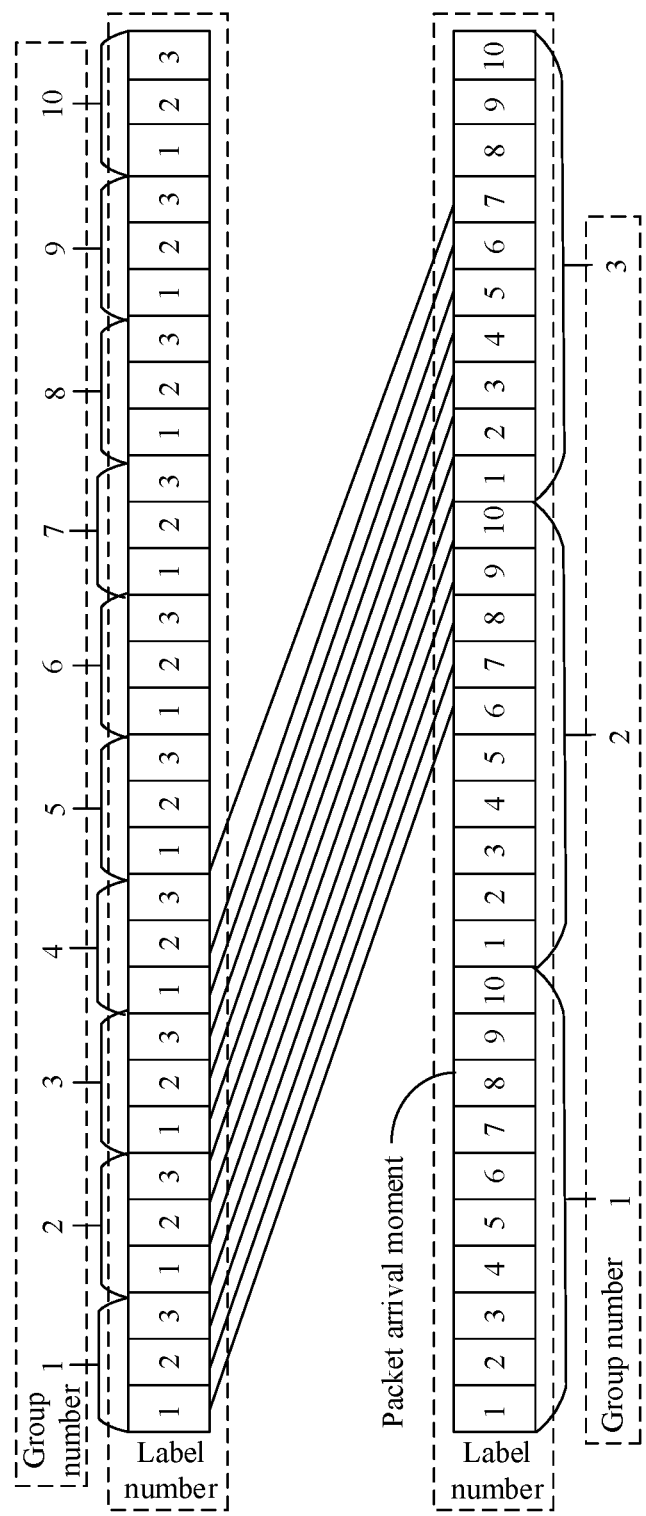
FIG. 13 is a schematic diagram of still another period mapping according to an embodiment of this application.

Specifically, the number of each period of the fourth network device is shown in the first line of FIG. 13. FIG. 13 is a schematic diagram of still another period mapping according to an embodiment of this application.

S141. The fifth network device numbers the periods.

Specifically, the fifth network device numbers each period of the fifth network device based on m4 and m5.

Because m4=3, and m5=10, the fifth network device calculates a common multiple L1 of m4 and m5, and determines, based on L1 and m5, a quantity x2 of groups into which the periods of the fifth network device can be divided:

$$x2=L1/m5=30/10=3$$

The fifth network device numbers each period of the fifth network device based on m5 and x2. Specifically, the number of each period of the fifth network device includes a label number and a group number.

Optionally, the label number is one of 0 to m5−1, and the group number is one of 0 to x2−1.

For example, a number of the $1^{st}$ period of the fifth network device is (0, 0), a number of the $2^{nd}$ period of the fifth network device is (1, 0), a number of the $3^{rd}$ period of the fifth network device is (2, 0), a number of the $4^{th}$ period of the fifth network device is (3, 0), . . . .

Specifically, the number of each period of the fifth network device is shown in the second line of FIG. 12.

Optionally, the label number is one of 1 to m5, and the group number is one of 1 to x2.

For example, the number of the $1^{st}$ period of the fifth network device is (1, 1), the number of the $2^{nd}$ period of the fifth network device is (2, 1), the number of the $3^{rd}$ period of the fifth network device is (3, 1), the number of the $4^{th}$ period of the fifth network device is (4, 1), . . . .

Specifically, the number of each period of the fifth network device is shown in the second line of FIG. 13.

S150. The third network device and the fourth network device perform period mapping.

A period label range of the third network device is the same as a period label range of the fourth network device, and period mapping is performed by using the prior art, for example, the period mapping method in FIG. 5.

S160. The fourth network device and the fifth network device perform period mapping.

The period label range of the fourth network device is different from a period label range of the fifth network device, and the following mapping solution is used:

The fourth network device sends a probe packet at a start moment of one super frame.

Optionally, a group number carried in the probe packet is 0, and a label is 0. A label of a period in which an arrival moment at which the probe packet arrives at the fifth network device is located is 7, a group number is 0, and a first offset is 8 Ts, as shown in FIG. 12.

Specifically, the start moment of the super frame may be understood as a start moment of the $1^{st}$ period of the fourth network device. The super frame is a product of a value of a period stipulated in a system and the least common multiple:

$$\text{super frame}=L1*T.$$

The fifth network device deviates the arrival moment of the packet, and a deviation manner is adding a jitter to the arrival moment of the packet.

In this embodiment, the jitter is 80 μs, that is, 8 Ts. As shown in FIG. 12, the arrival moment of the packet plus the jitter is the group number 1 and the label 5. A total offset is 16 Ts.

The fifth network device establishes mapping relationships between the periods of the fourth network device and the periods of the fifth network device, and details are shown in Table 2.

TABLE 2

| Mapping table | | | |
|---|---|---|---|
| Source group number | Source group number | Source group number | Source group number |
| 0 | 0 | 1 | 5 |
| 0 | 1 | 1 | 6 |
| 0 | 2 | 1 | 7 |
| 1 | 0 | 1 | 8 |
| 1 | 1 | 1 | 9 |
| 1 | 2 | 2 | 0 |
| . . . | . . . | . . . | . . . |

Optionally, a group number carried in the probe packet is 1, and a label is 1. A label of a period in which an arrival moment at which the probe packet arrives at the fifth network device is located is 8, a group number is 1, and a first offset is 8 Ts, as shown in FIG. 13.

The fifth network device deviates the arrival moment of the packet, and a deviation manner is adding a jitter to the arrival moment of the packet.

In this embodiment, the jitter is 80 μs, that is, 8 Ts. As shown in FIG. 13, the arrival moment of the packet plus the jitter is the group number 2 and the label 6. A total offset is 16 Ts.

The fifth network device establishes the mapping relationships between the periods of the fourth network device and the periods of the fifth network device, and details are shown in Table 3.

TABLE 3

Mapping table

| Source group number | Source label number | Destination group number | Destination label number |
|---|---|---|---|
| 1 | 1 | 2 | 6 |
| 1 | 2 | 2 | 7 |
| 1 | 3 | 2 | 8 |
| 2 | 1 | 2 | 9 |
| 2 | 2 | 2 | 10 |
| 2 | 3 | 3 | 1 |
| ... | ... | ... | ... |

The fifth network device performs scheduling by using the mapping table: Subsequently, when receiving a packet sent by the fourth network device, the fifth network device selects, based on the mapping relationship, a period that corresponds to the destination label number and the destination group number, performs forwarding by using the period, replaces a label carried in the packet with a destination label, and replaces a group number carried in the packet with the destination group number.

Specifically, a period number carried in the packet sent by the fourth network device includes the following:

When a network protocol between the fourth network device and the fifth network device is IPv4, the DSCP and ECN field may be used to carry the period number. The DSCP and ECN field includes 8 bits in total. A most significant bit is set to 1, and it indicates that a DIP function is enabled.

When m4 of the fourth network device is equal to 3, and the quantity of groups is x1=10, the label number is filled in two least significant bits, and the group number is filled in 4 bits more significant than the 2 least significant bits.

For example, the fifth network device receives a packet that is sent in the $6^{th}$ period of the fourth network device. A number of the sixth period of the fourth network device is <1, 2>, where a source group number is 1, and a source label number is 2. Then, a binary value of the DSCP and ECN field is (10000110), and it is obtained by searching Table 2 that the destination group number is 2 and the destination label number is 0.

Then, the packet that is sent in the $6^{th}$ period of the fourth network device and that is received by the fifth network device is sent in the $21^{st}$ period of the fifth network device. The period number <1, 2> carried in the packet is updated to <2, 0>, or to a number that can be used by a downstream device of the fifth network device to determine a corresponding sending period, so that the downstream device of the fifth network device determines a period of forwarding the packet.

For another example, the fifth network device receives a packet that is sent in the $4^{th}$ period of the fourth network device. A number of the $4^{th}$ period of the fourth network device is <2, 1>, where a source group number is 2, and a source label number is 1. Then, a binary value of the DSCP and ECN field is (10001001), and it is obtained by searching Table 2 that the destination group number is 3 and the destination label number is 9.

Then, the packet that is sent in the $4^{th}$ period of the fourth network device and that is received by the fifth network device is sent in the $29^{th}$ period of the fifth network device. The period number <2, 1> carried in the packet is updated to <3, 9>, or to a number that can be used by a downstream device of the fifth network device to determine a corresponding sending period, so that the downstream device of the fifth network device determines a period of forwarding the packet.

When a network protocol between the fourth network device and the fifth network device is IPv6, the period number is placed in a hop by hop extension header, and a binary value is the same as that in IPv4. Details are not described herein again.

It should be understood that FIG. 9 to FIG. 13 are merely an example form, and cannot limit the protection scope of this application. For example, the fifth jitter may be 100 µs, or the fourth jitter may be 11 µs.

Cases are not described herein one by one.

It should be noted that in this embodiment of this application, first, second, third, and the like are merely used for ease of distinguishing between different objects, and should not constitute any limitation to this application, for example, first, second, third, and the like are used to distinguish between different network devices, different indication information, and the like.

The foregoing describes, in detail with reference to FIG. 6 to FIG. 13, the period mapping method provided in the embodiments of this application, and the following describes, in detail with reference to FIG. 14 to FIG. 17, a first network device and a second network device that are provided in the embodiments of this application.

Figure 14:
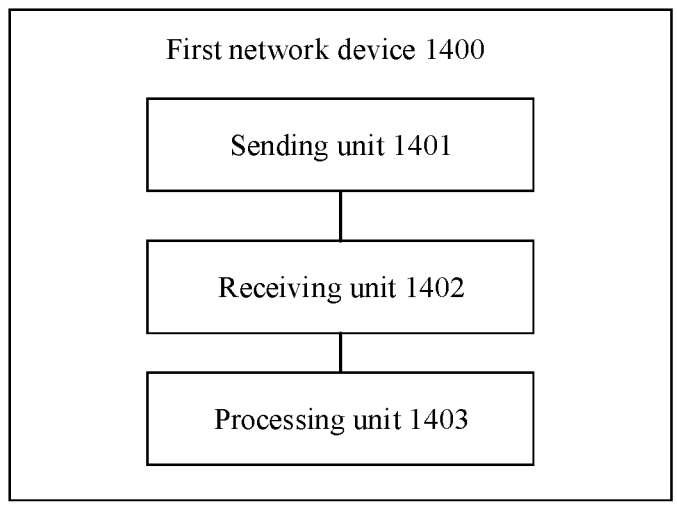
FIG. 14 is a schematic block diagram of a first network device according to an embodiment of this application.

FIG. 14 is a schematic block diagram of a first network device 1400 according to an embodiment of this application. The first network device includes a sending unit 1401, a receiving unit 1402, and a processing unit 1403.

The receiving unit 1402 is configured to receive first information sent by a second network device, where the first information carries a first number, the first number is a number of the $1^{st}$ period of the second network device, and the first number includes a first label number and a first group number.

The processing unit 1403 is configured to determine a first period that can be used to send the first information, where a second number of the first period includes a second label number and a second group number, and the first label number and the first group number meet a mapping relationship with the second label number and the second group number.

The processing unit 1403 is further configured to establish mapping relationships between numbers of a plurality of periods of the first network device and numbers of a plurality of periods of the second network device based on the mapping relationship.

Optionally, that the processing unit 1403 is configured to determine the first period that can be used to send the first information includes: the processing unit 1403 determines, based on a first moment and the first jitter jitter, the first period that can be used to send the first information, where the first moment is a moment at which the first network device receives the first information, and the first jitter is a jitter of the first network device.

Optionally, before the receiving unit 1402 receives the first information sent by the second network device, the processing unit 1403 is further configured to determine m based on the first jitter jitter, where m is a quantity of label numbers used to identify the periods of the first network device, and the first jitter is the jitter of the first network device.

The receiving unit 1402 is further configured to receive second information sent by the second network device, where the second information indicates n, n is a quantity of label numbers used to identify the periods of the second network device, and m and n are positive integers.

The processing unit 1403 numbers each period of the first network device based on m and n.

Optionally, that the processing unit 1403 numbers each period of the first network device based on m and n includes:

the processing unit 1403 calculates a least common multiple L of m and n;

the processing unit 1403 determines, based on L and m, a quantity x of groups into which the periods of the first network device can be divided; and the processing unit 1403 numbers each period of the first network device based on m and x, where the number of each period of the first network device includes a label number and a group number.

Specifically, the quantity of groups is x=L/m, and each group in the x groups of periods includes m periods.

Optionally, the sending unit 1401 is configured to send third information to the second network device, where the third information indicates m, and m is used to support the second network device in numbering each period of the second network device.

Specifically, that the first information carries the first number includes:

p bits of the first information are used to indicate a value of the first label number; and q bits of the first information are used to indicate a value of the first group number, where p and q are positive integers.

It should be understood that the processing unit 1403 in this embodiment of this application may be implemented by a processor or a processor-related circuit component, and the sending unit 1402 and the receiving unit 1401 may be implemented by a transceiver or a transceiver-related circuit component.

Figure 15:
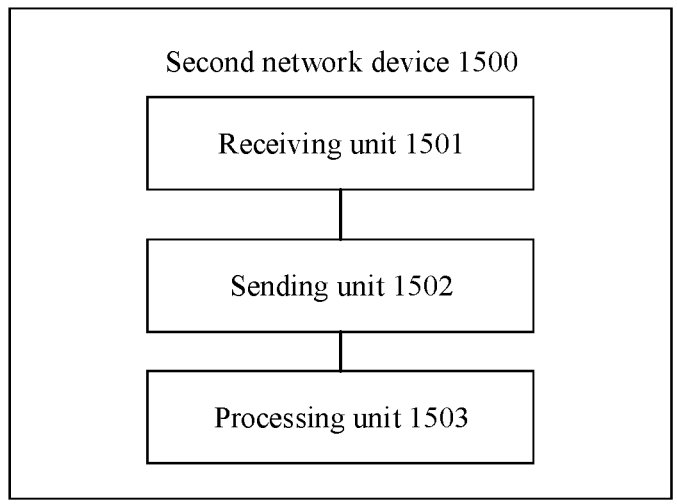
FIG. 15 is a schematic block diagram of a second network device according to an embodiment of this application.

FIG. 15 is a schematic block diagram of a second network device 1500 according to an embodiment of this application. The second network device includes a receiving unit 1501, a sending unit 1502, and a processing unit 1503.

The processing unit 1503 is configured to determine a first number, where the first number is a number of the $1^{st}$ period of the second network device, and the first number includes a first label number and a first group number.

The sending unit 1502 is configured to send first information to a first network device, where the first information carries the first number, and the first information is used to support the first network device in establishing mapping relationships between numbers of a plurality of periods of the first network device and numbers of a plurality of periods of the second network device.

Optionally, that the processing unit 1503 determines the first number includes:

the processing unit 1503 determines n based on a second jitter jitter, where n is a quantity of label numbers used to identify the periods of the second network device, and the second jitter is a jitter of the second network device;

the second network device further includes:

a receiving unit 1501, configured to receive third information sent by the first network device, where the third information indicates m, m is a quantity of label numbers used to identify the periods of the first network device, and m and n are positive integers; and the processing unit 1503 numbers each period of the second network device based on m and n, and determines the first number.

Specifically, that the processing unit 1503 numbers each period of the second network device based on m and n includes:

the processing unit 1503 calculates a least common multiple L of m and n;

the processing unit 1503 determines, based on L and n, a quantity y of groups into which the periods of the second network device can be divided; and the processing unit 1503 numbers each period of the second network device based on n and y, where the number of each period of the second network device includes a label number and a group number.

Specifically, the quantity of groups is y=L/n, and each group in the y groups of periods includes n periods.

The sending unit 1502 is further configured to send second information to the first network device, where the second information indicates n, and n is used to support the first network device in numbering each period of the first network device.

Specifically, that the first information carries the first number includes:

p bits of the first information are used to indicate a value of the first label number; and q bits of the first information are used to indicate a value of the first group number, where p and q are positive integers.

It should be understood that the processing unit 1503 in this embodiment of this application may be implemented by a processor or a processor-related circuit component, and the sending unit 1502 and the receiving unit 1501 may be implemented by a transceiver or a transceiver-related circuit component.

Figure 16:
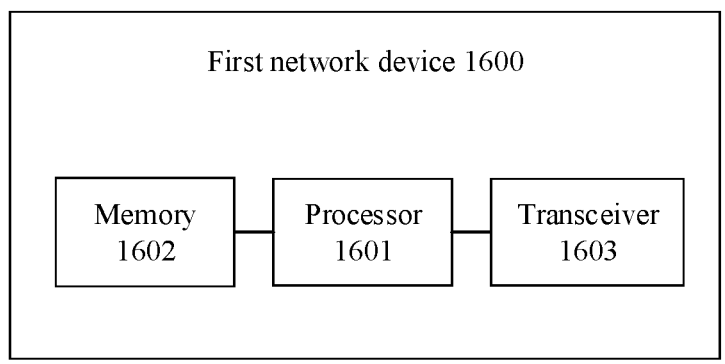
FIG. 16 is another schematic block diagram of a first network device according to an embodiment of this application.

As shown in FIG. 16, an embodiment of this application further provides a first network device 1600. The first network device 1600 includes a processor 1601, a memory 1602, and a transceiver 1603. The memory 1602 stores an instruction or a program, and the processor 1603 is configured to execute the instruction or the program stored in the memory 1602. When the instruction or the program stored in the memory 1602 is executed, the processor 1601 is configured to perform an operation performed by the processing unit 1403 in the embodiment shown in FIG. 14, and the transceiver 1603 is configured to perform operations performed by the receiving unit 1402 and the sending unit 1401 in the embodiment shown in FIG. 14.

Figure 17:
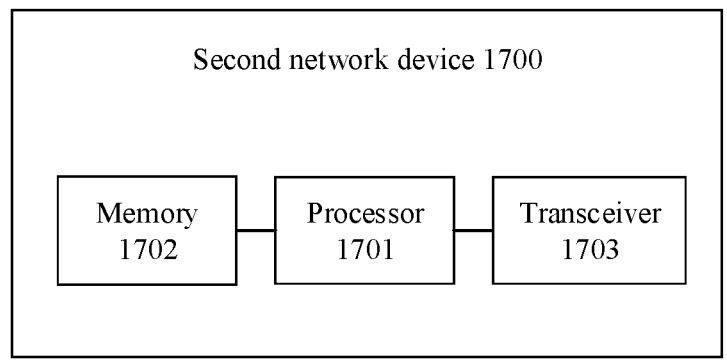
FIG. 17 is another schematic block diagram of a second network device according to an embodiment of this application.

As shown in FIG. 17, an embodiment of this application further provides a second network device 1700. The second network device 1700 includes a processor 1701, a memory 1702, and a transceiver 1703. The memory 1702 stores an instruction or a program, and the processor 1703 is configured to execute the instruction or the program stored in the memory 1702. When the instruction or the program stored in the memory 1702 is executed, the processor 1701 is configured to perform an operation performed by the processing unit 1503 in the embodiment shown in FIG. 15, and the transceiver 1703 is configured to perform operations performed by the receiving unit 1502 and the sending unit 1501 in the embodiment shown in FIG. 15.

Still another aspect of this application provides a computer readable storage medium. The computer readable storage medium stores an instruction, and when the instruction is run on a computer, the computer is enabled to perform steps performed by the first network device in the methods in FIG. 6 to FIG. 13.

Still another aspect of this application provides a computer readable storage medium. The computer readable storage medium stores an instruction, and when the instruction is run on a computer, the computer is enabled to perform steps performed by the second network device in the methods in FIG. 6 to FIG. 13.

Still another aspect of this application provides a computer program product including an instruction. When the computer program product is run on a computer, the computer is enabled to perform steps performed by the first network device in the methods in FIG. 6 to FIG. 13.

Still another aspect of this application provides a computer program product including an instruction. When the computer program product is run on a computer, the computer is enabled to perform steps performed by the second network device in the methods in FIG. 6 to FIG. 13.

Still another aspect of this application provides a chip system. The system includes a processor, an input pin, an output pin, and the like. The processor performs steps performed by the first network device in the methods in FIG. 6 to FIG. 13.

Still another aspect of this application provides a chip system. The system includes a processor, an input pin, an output pin, and the like. The processor performs steps performed by the second network device in the methods in FIG. 6 to FIG. 13.

It should be understood that, the processor mentioned in the embodiments of the present disclosure may be a central processing unit (central processing unit, CPU), the processor may further be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like.

It may be understood that the memory mentioned in the embodiments of the present disclosure may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a universal processor, a DSP, an ASIC, an FPGA or another programmable logic device, a discrete gate or a transistor logic device, or a discrete hardware component, the memory (the storage module) is integrated into the processor.

It should be noted that the memory described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A period mapping method, comprising:
   determining, by a first network device, m based on a first jitter, wherein m is a quantity of label numbers used to identify a plurality of periods of the first network device, and the first jitter is a jitter of the first network device;
   receiving, by the first network device, second information sent by a second network device, wherein the second information indicates n, n is a quantity of label numbers used to identify a plurality of periods of the second network device, and m and n are positive integers;
   numbering, by the first network device, each period of the first network device based on m and n;
   after the numbering, receiving, by the first network device, first information sent by the second network device, wherein the first information carries a first number, the first number is a number of a first period of the second network device, and the first number comprises a first label number and a first group number;
   determining, by the first network device, the first period that can be used to send the first information, wherein a second number of the first period comprises a second label number and a second group number, the first label number and the first group number meet a mapping relationship with the second label number and the second group number; and
   establishing, by the first network device, mapping relationships between numbers of the plurality of periods of the first network device and numbers of the plurality of periods of the second network device based on the mapping relationship.

2. The method according to claim 1, wherein the determining, by the first network device, the first period that can be used to send the first information comprises:
   determining, by the first network device based on a first moment and the first jitter, the first period that can be used to send the first information, wherein the first moment is a moment at which the first network device receives the first information.

3. The method according to claim 1, wherein that the first information carries the first number comprises:
   p bits of the first information are used to indicate a value of the first label number; and
   q bits of the first information are used to indicate a value of the first group number, wherein p and q are positive integers.

4. The method according to claim 1, wherein the numbering, by the first network device, each period of the first network device based on m and n comprises:
   calculating, by the first network device, a least common multiple L of m and n;
   determining, by the first network device based on L and m, a quantity x of groups into which the periods of the first network device can be divided; and
   numbering, by the first network device, each period of the first network device based on m and x, wherein the number of each period of the first network device comprises a label number and a group number.

5. The method according to claim 4, wherein the quantity of groups is x=L/m, and each group in the x groups of periods comprises m periods.

6. The method according to claim 1, wherein the method further comprises:
   sending, by the first network device, third information to the second network device, wherein the third information indicates m, and m is used to support the second network device in numbering each period of the second network device.

7. A period mapping method, comprising:
   determining, by a second network device, n based on a second jitter, wherein n is a quantity of label numbers used to identify a plurality of periods of the second network device, and the second jitter is a jitter of the second network device;
   receiving, by the second network device, third information sent by a first network device, wherein the third information indicates m, m is a quantity of label numbers used to identify a plurality of periods of the first network device, and m and n are positive integers; and
   numbering, by the second network device, each period of the second network device based on m and n;
   determining, by the second network device, a first number, wherein the first number is a number of a first period of the second network device, and the first number comprises a first label number and a first group number; and
   sending, by the second network device, first information to the first network device, wherein the first information carries the first number, and the first information is used to support the first network device in establishing mapping relationships between numbers of the plurality of periods of the first network device and numbers of the plurality of periods of the second network device.

8. The method according to claim 7, wherein the method further comprises:
   sending, by the second network device, second information to the first network device, wherein the second information indicates n, and n is used to support the first network device in numbering each period of the first network device.

9. The method according to claim 7, wherein that the first information carries the first number comprises:
   p bits of the first information are used to indicate a value of the first label number; and
   q bits of the first information are used to indicate a value of the first group number, wherein p and q are positive integers.

10. The method according to claim 7, wherein the numbering, by the second network device, each period of the second network device based on m and n comprises:
    calculating, by the second network device, a least common multiple L of m and n;
    determining, by the second network device based on L and n, a quantity y of groups into which the periods of the second network device can be divided; and
    numbering, by the second network device, each period of the second network device based on n and y, wherein the number of each period of the second network device comprises a label number and a group number.

11. The method according to claim 10, wherein the quantity of groups is y=L/n, and each group in the y groups of periods comprises n periods.

12. A first network device, comprising:
    a receiver, configured to receive first information sent by a second network device, wherein the first information carries a first number, the first number is a number of a first period of the second network device, and the first number comprises a first label number and a first group number; and a processor and a memory comprising instructions, wherein when executing the instructions the processor is configured to determine the first period that can be used to send the first information, wherein a second number of the first period comprises a second label number and a second group number, the first label number and the first group number meet a mapping relationship with the second label number and the second group number, wherein when executing the instructions the processor is further configured to establish mapping relationships between numbers of a plurality of periods of the first network device and numbers of a plurality of periods of the second network device based on the mapping relationship, before the receiver receives the first information sent by the second network device, when executing the instructions the processor is further configured to determine m based on the first jitter, wherein m is a quantity of label numbers used to identify the periods of the first network device, and the first jitter is a jitter of the first network device, the receiver is further configured to receive second information sent by the second network device, wherein the second information indicates n, n is a quantity of label numbers used to identify the periods of the second network device, and m and n are positive integers; and when executing the instructions the processor is configured to number each period of the first network device based on m and n.

13. The first network device according to claim 12, wherein the first network device further comprises:

a sending unit, configured to send third information to the second network device, wherein the third information indicates m, and m is used to support the second network device in numbering each period of the second network device.

14. The first network device according to claim 12, wherein that the first information carries the first number comprises:

p bits of the first information are used to indicate a value of the first label number; and q bits of the first information are used to indicate a value of the first group number, wherein p and q are positive integers.

15. The first network device according to claim 12, wherein that the processor is configured to determine the first period that can be used to send the first information comprises:

the processor is configured to determine, based on a first moment and the first jitter, the first period that can be used to send the first information, wherein the first moment is a moment at which the first network device receives the first information.

16. The first network device according to claim 12, wherein that the processor is configured to number each period of the first network device based on m and n comprises:

the processor is configured to calculate a least common multiple L of m and n;

the processor is configured to determine, based on L and m, a quantity x of groups into which the periods of the first network device can be divided; and the processor is configured to number each period of the first network device based on m and x, wherein the number of each period of the first network device comprises a label number and a group number.

17. The first network device according to claim 16, wherein the quantity of groups is x=L/m, and each group in the x groups of periods comprises m periods.

* * * * *